(12) United States Patent
Cooke et al.

(10) Patent No.: US 7,903,925 B2
(45) Date of Patent: Mar. 8, 2011

(54) FIBER OPTIC FURCATION ASSEMBLY HAVING FEATURE(S) FOR CABLE MANAGEMENT

(75) Inventors: Terry L. Cooke, Hickory, NC (US); David L. Dean, Jr., Hickory, NC (US); Christopher S. Houser, Newton, NC (US); Tory A. Klavuhn, Newton, NC (US); Clyde B. Mabry, III, Salisbury, NC (US)

(73) Assignee: Corning Cable Systems LLC, Hickory, NC (US)

(*) Notice: Subject to any disclaimer, the term of this patent is extended or adjusted under 35 U.S.C. 154(b) by 63 days.

(21) Appl. No.: 12/394,140

(22) Filed: Feb. 27, 2009
(Under 37 CFR 1.47)

(65) Prior Publication Data

US 2010/0054676 A1  Mar. 4, 2010

Related U.S. Application Data

(60) Provisional application No. 61/197,068, filed on Oct. 23, 2008, provisional application No. 61/190,538, filed on Aug. 29, 2008.

(51) Int. Cl.
*G02B 6/00* (2006.01)
*G02B 6/44* (2006.01)

(52) U.S. Cl. .................. 385/136; 385/100; 385/134
(58) Field of Classification Search .................. 385/136
See application file for complete search history.

(56) References Cited

U.S. PATENT DOCUMENTS

| 6,738,555 | B1 | 5/2004 | Cooke et al. | 385/136 |
| 7,330,629 | B2 | 2/2008 | Cooke et al. | 385/136 |
| 2004/0197066 | A1 | 10/2004 | Daoud | 385/136 |
| 2008/0138026 | A1 | 6/2008 | Yow et al. | 385/137 |

FOREIGN PATENT DOCUMENTS

GB    2438654 A    12/2007

*Primary Examiner* — Rhonda S Peace
(74) *Attorney, Agent, or Firm* — Michael E. Carroll, Jr.

(57) ABSTRACT

Fiber optic cable assemblies having a fiber optic cable, a furcation body, and one or more furcated legs are disclosed herein. In embodiments disclosed herein, the furcation body comprises a first end and a second end opposite the first end, the first end having the fiber optic cable extending therefrom, and the second end having one or more furcated legs extending therefrom. The furcation body can include one or more features that facilitate cable management by supporting cabling components used in making fiber optic interconnections. The cable management features of the fiber optic cable assemblies advantageously inhibit sagging, facilitate access to fiber optic interconnections, and/or improve air flow paths between fiber optic interconnections.

24 Claims, 22 Drawing Sheets

FIBER OPTIC FURCATION ASSEMBLY HAVING FEATURE(S) FOR CABLE MANAGEMENT

RELATED APPLICATIONS

The present application claims priority to U.S. Provisional Patent Application Ser. No. 61/197,068, filed Oct. 23, 2008, titled "High Density Data Center Hardware Assemblies, and Components," which is incorporated herein by reference in its entirety.

The present application also claims priority to U.S. Provisional Patent Application Ser. No. 61/190,538, filed Aug. 29, 2008, titled "High Density Data Center Hardware Assemblies, and Components," which is incorporated herein by reference in its entirety.

BACKGROUND

1. Field of the Disclosure

The technology of the disclosure relates to fiber optic cable management. More specifically, the disclosure relates to fiber optic cable assemblies for fiber optic cable management.

2. Technical Background

Benefits of optical fiber use include extremely wide bandwidth and low noise operation. Because of these advantages, optical fiber is increasingly being used for a variety of applications, including but not limited to broadband voice, video, and data transmission. Fiber optic communications networks include a number of interconnection points and related equipment such as in data centers, patch panels, and the like. By way of example, interconnections points in the data center occur between truck cables and distribution cables in an equipment rack or the like.

Due to increasing demand for fiber optic networks, data centers are increasingly being provided and upgraded to support higher densities of interconnection points. The higher densities reduce the amount of floor space, rack space, and the routing pathways, etc. However, while use of higher density cabling components allows a larger number of interconnections to be made within a given space or area complications result. For instance, the increased number of interconnections in the given space or area leads to an increase in cable congestion and heat per unit area due to the increased heat from fiber optic equipment and the increased cable congestion. Thus, maintaining airflow is a consideration for maintaining data centers and the like. Moreover, the higher densities complicate cable routing and management to inhibit tangling of fiber optic cable assemblies and the like.

For example, fiber optic equipment is typically configured to support rows or columns of fiber optic interconnections where air can flow between the adjacent rows or columns to dissipate heat. However, the higher density cabling components often sag into adjacent rows or columns. Sagging cabling components can potentially adversely affect air flow, because sagging cabling components can invade air flow paths around fiber optic interconnections and thus reduce or block the air flow path. Reducing or blocking air flow paths around fiber optic interconnections can decrease the dissipation rate of heat, which may already be at increased levels in fiber optic equipment supporting high density interconnections. Also sagging cabling components also make it more difficult for an installer to access an adjacent row or column of fiber optic connectors and can create tangling issues that may disrupt the system.

FIG. 1 illustrates a front view of an exemplary fiber optic equipment rack and fiber optic patch panel having conventional fiber optic cable 12. As illustrated in FIG. 1, fiber optic equipment rack 10 has a vertical orientation for establishing fiber optic connections. Specifically, connectorized fiber optic cables 12 are routed vertically to fiber optic equipment 14 installed in the fiber optic equipment rack 10 and arranged in vertical blades 16. Each blade 16 occupies a vertical plane and it may be necessary to access a single blade with out disturbing the interconnections of other blades. Typically, the fiber optic cables 12 are connected to connectors with interface with adapters 18 provided on the fiber optic equipment 14. As shown, straps 20 are disposed around subsets of the fiber optic cables 12 to form fiber bundles 22 of fiber optic cables 12 to provide cable management. The fiber bundles 22 are routed through routing guides 24 extending vertically along a side 26 of the fiber optic equipment rack 10. However, fiber optic cables 12 from one vertical blade 16 extend and/or sag into the column of space 19 between an adjacent vertical blade(s) 16 as shown. Moreover, the problem can be worse with horizontal arrangements.

This sagging and congestion creates access and airflow issues. As shown, when installed the fiber optic cables 12 (left-side) create congestion since the columns of space 19 between the blades 16 is blocked. This creates issues for providing finger access to connectors on the fiber optic cables 12 and connectors or adapters 18 on the fiber optic equipment 14, and also restricts air flow causing heat generation issues. Thus, there is a need for fiber optic assemblies with improved cable management features.

SUMMARY OF THE DETAILED DESCRIPTION

Embodiments disclosed in the detailed description include fiber optic cable assemblies having a fiber optic cable, a furcation body, and one or more furcated legs. In embodiments disclosed herein, the furcation body comprises a first end and a second end opposite the first end, the first end having the fiber optic cable extending therefrom, and the second end having one or more furcated legs extending therefrom. The furcation body can include one or more features that facilitate fiber optic cable management. These disclosed features of fiber optic cable assemblies may advantageously inhibit fiber optic cable assemblies from sagging (i.e., provide support), facilitate access to fiber optic interconnections, prevent or reduce obstruction of air flow paths between fiber optic interconnections, and/or inhibit tangling among fiber optic assemblies.

Additional features and advantages will be set forth in the detailed description which follows, and in part will be readily apparent to those skilled in the art from that description or recognized by practicing the invention as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

DETAILED DESCRIPTION OF THE PREFERRED EMBODIMENTS

Reference will now be made in detail to the preferred embodiments of the present invention, examples of which are illustrated in the accompanying drawings, in which some, but not all embodiments are shown. Indeed, the concepts may be embodied in many different forms and should not be construed as limited to the embodiments set forth herein; rather, these embodiments are provided so that this disclosure will satisfy applicable legal requirements. Whenever possible, like reference numbers will be used to refer to like components or parts.

Embodiments disclosed in the detailed description include fiber optic cable assemblies having a fiber optic cable, a furcation body, and one or more furcated legs. In embodiments disclosed herein, the furcation body comprises a first end and a second end opposite the first end, the first end having the fiber optic cable extending therefrom, and the second end having one or more furcated legs extending therefrom. The furcation body can include one or more support features that facilitate supporting cabling components of adjacent fiber optic cable assemblies when making fiber optic interconnections. Consequently, the fiber optic cable assemblies disclosed are advantageous since they may reduce or prevent the cabling components in the cabling assemblies from sagging and tangling, facilitate access to fiber optic interconnections, and/or prevent or reduce obstruction of air flow paths between fiber optic interconnections.

Figure 2A:
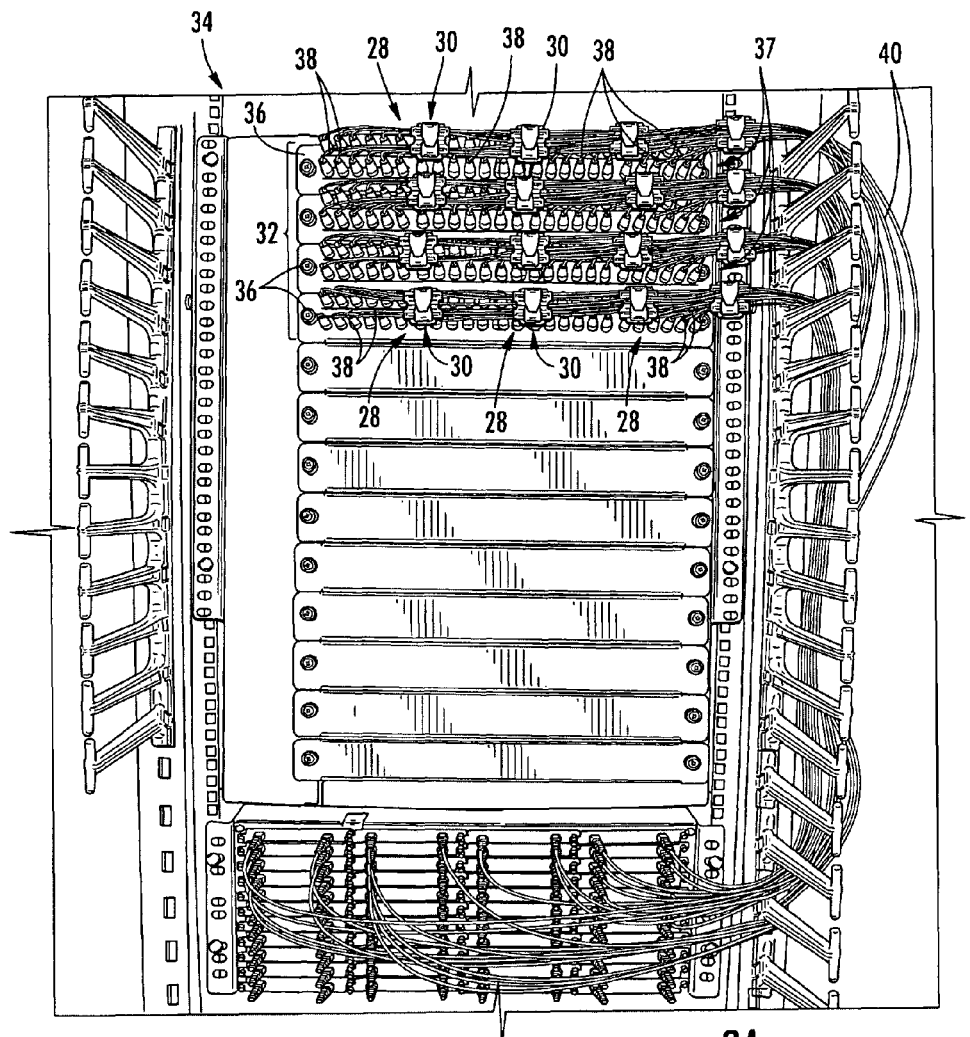
FIG. 2A is a front view of an exemplary fiber optic equipment rack and fiber optic patch panel having supported fiber optic cable assemblies.
Figure 2B:
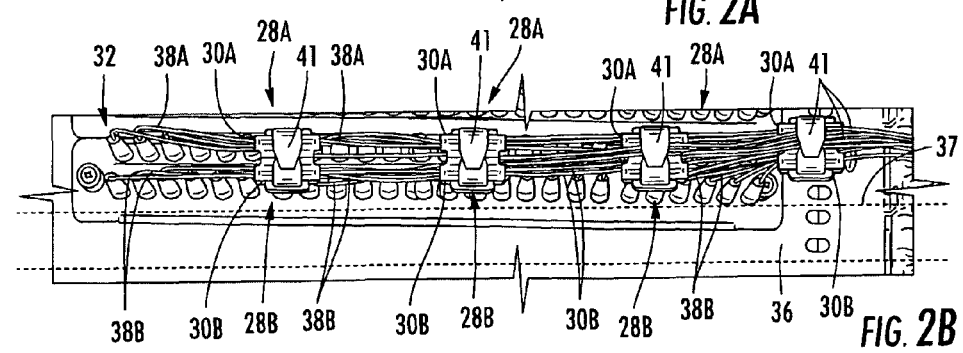
FIG. 2B is a close-up view of the fiber optic cable assemblies interconnected to the fiber optic patch panel illustrated in FIG. 2A.

FIGS. 2A and 2B depict fiber optic cable assemblies 28 that include furcation bodies 30 employing one or more features for cable management. As shown, the support feature(s) of the furcation bodies 30 support adjacent fiber optic cable assemblies 28 to prevent or reduce sagging into adjacent areas, thus blocking or reducing air flow. Simply stated, the fiber optic cables and/or furcated legs of adjacent fiber optic cable assemblies are supported by the furcation body 30. As illustrated, an equipment rack 34 receives fiber optic cable assemblies 28 to support interconnections with fiber optic equipment 32 contained therein having one or more fiber optic patch panels. In this example, the fiber optic equipment 32 is arranged horizontally with horizontally-arranged blades 36. Even though arranged horizontally, fiber optic cable assemblies 28 still provide horizontal columns of space 37 between the blades 36 and fiber optic equipment 32 to allow access to the fiber optic equipment 32 and to provide an air flow path between adjacent fiber optic equipment 32.

As will be discussed in more detail below, the furcation bodies 30 of fiber optic cable assemblies 28 include one or more support features that inhibit adjacent fiber optic assemblies 28 (i.e., its furcated legs 38 and/or fiber optic cable 40) from sagging and extending into an adjacent column of space 37. FIG. 2B illustrates a close-up view of FIG. 2A, showing upper and lower furcation bodies 30A, 30B that are cooperatively secured to each other for supporting a fiber optic cable 40 and/or one or more furcated legs 38A, 38B having a fiber optic connector of adjacent upper and lower fiber optic cable assemblies 28A, 28B. Specifically, the upper and lower furcation bodies 30A, 30B contain one or more support features that facilitate securing the upper furcation body 30A to the lower furcation body 30B to support adjacent fiber optic cable assemblies 28A, 28B and inhibit sag into adjacent columns of space 37 and tangling of cable assemblies.

As shown in FIG. 2B, the upper furcation body 30A allows the upper fiber optic cable assemblies 28A to support the lower fiber optic cable assemblies 28B. Otherwise, gravity would tend to pull the lower fiber optic cable assemblies 28B into the adjacent column of space 37, thereby affecting access and reducing air flow. The upper fiber optic cable assembly 28A is supported by the furcated leg 38 connections to the fiber optic equipment 32. Also, by securing the lower furcation bodies 30B to the upper furcation bodies 30A, the lower furcation bodies 30B pull the upper fiber optic cable assemblies 28A toward the lower furcation bodies 30B, which may be useful in the event that the upper furcated legs 38A contain slack. The connections of the furcated legs 38A, 38B of the fiber optic cable assemblies 28A, 28B may be pulled tight to further increase support. The forces applied by the upper and lower furcation bodies 30A, 30B reach an equilibrium to secure the fiber optic cable assemblies 28A, 28B in place after the upper and lower furcation bodies 30A, 30B are attached to each other during installation.

Figure 1:
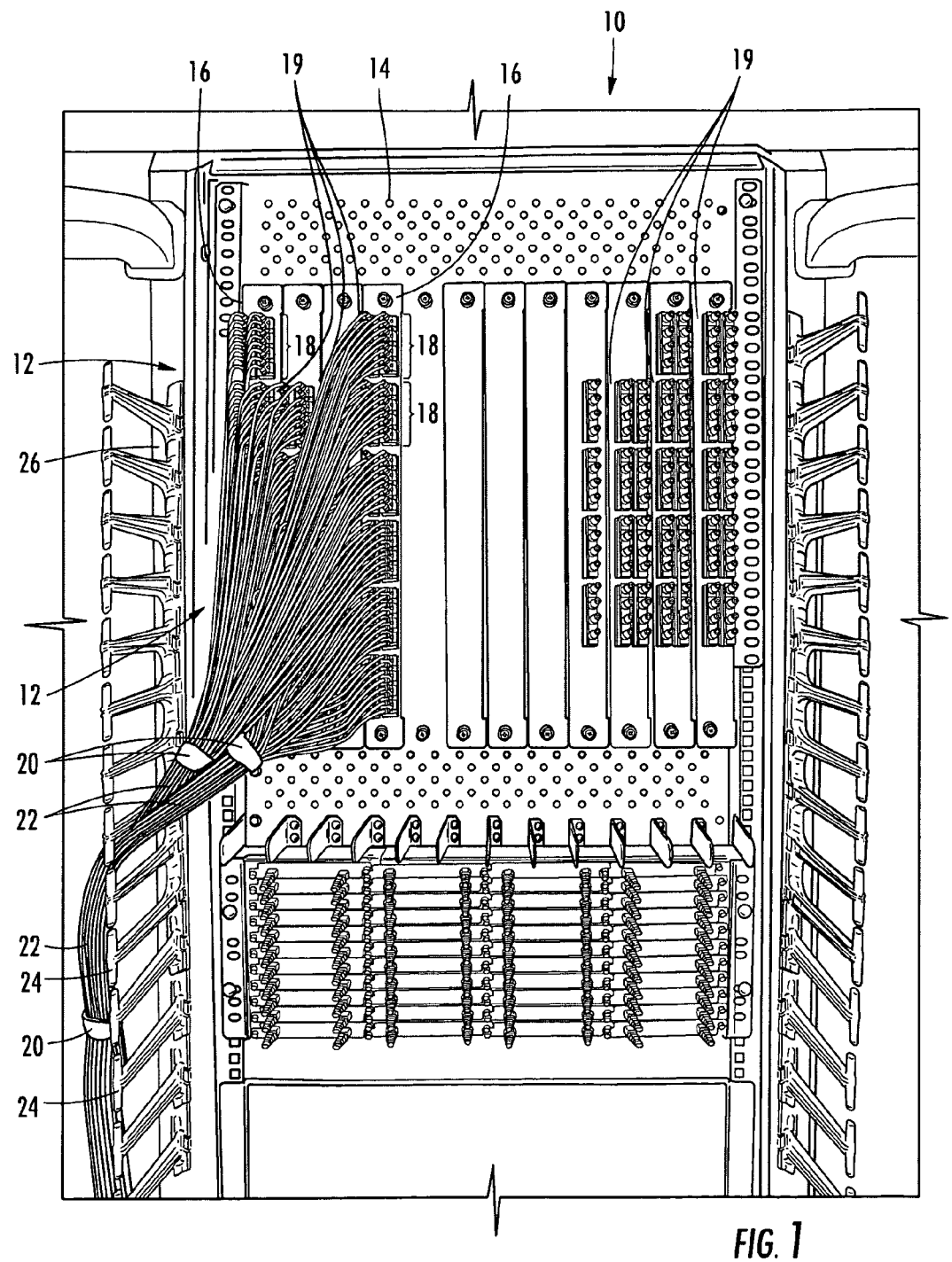
FIG. 1 is a front view of an exemplary fiber optic equipment rack and fiber optic patch panel having conventional fiber optic cables.

The upper and lower furcation bodies 30A, 30B can be used in a different configuration rather than an upper and lower arrangement. For example, if the fiber optic cable assemblies 28A, 28B were arranged vertically like in FIG. 1, instead of horizontally as provided in FIGS. 2A and 2B, the furcation bodies 30A, 30B would be arranged in a vertical plane with the respective furcation bodies 30 having a side-to-side orientation instead of top and bottom. Furcation bodies 30A, 30B may have any suitable design as will be discussed in more detail below along with variations. For example, as illustrated in FIG. 2B, the upper and lower furcation bodies 30A, 30B may contain attachment features that support an attachment device 41, such as a strap or other binding, such as a Velcro® strip or Ty-rap®, a string, an adhesive strip, and a clamp, as examples, to secure the furcation bodies 30A, 30B to each other or to secure fiber optic cables/fucated legs. More detail regarding the attachment device 41 and attachment features for use with a furcation body for supporting and allowing the attachment device 41 to secure and support a furcation body and one or more fiber optic cable assemblies is discussed in detail below.

Figure 3A:
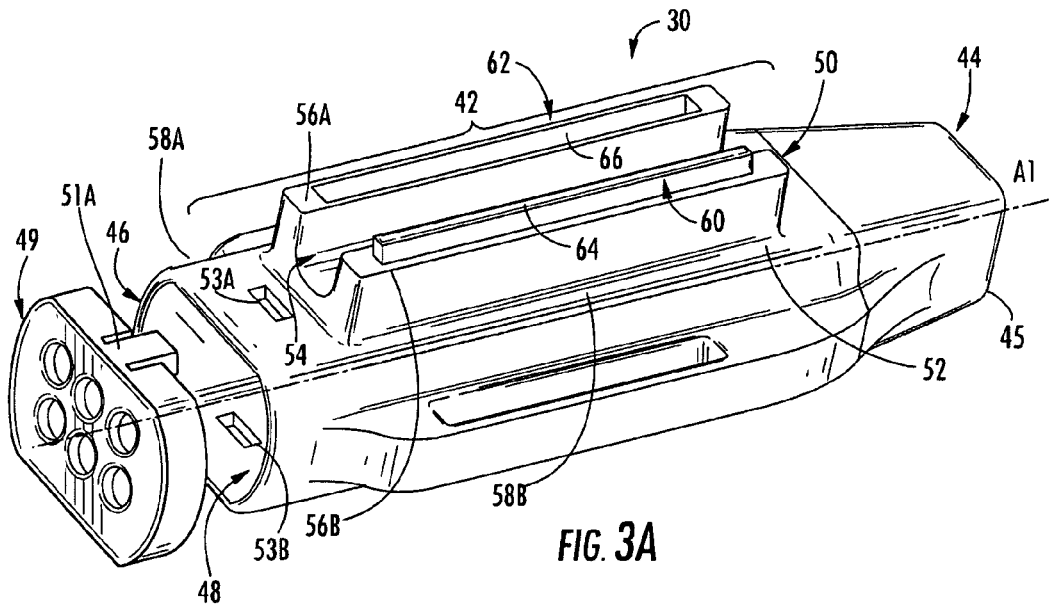
FIGS. 3A and 3B are perspective side and top views of a furcation body according to an embodiment.
Figure 3B:
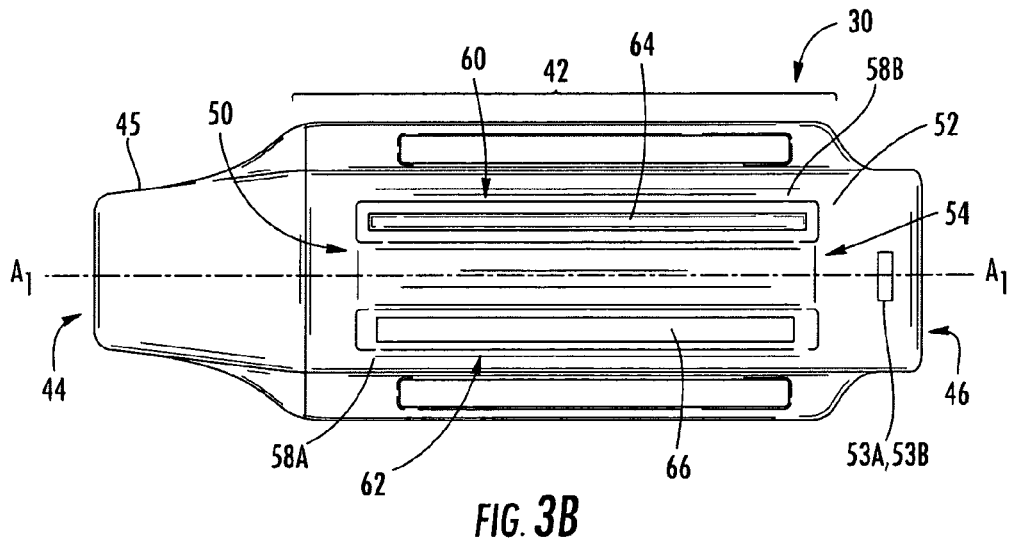
Figure 4:
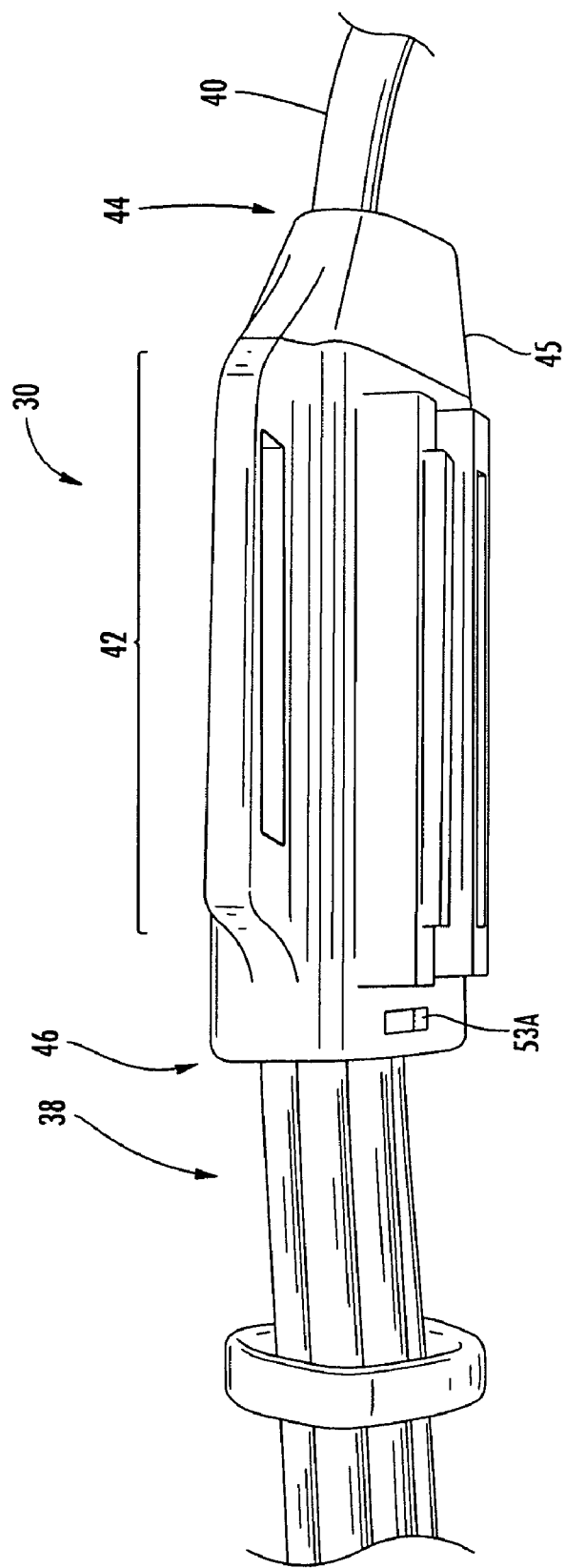
FIG. 4 illustrates an exemplary fiber optic cable assembly employing the furcation body of FIGS. 3A and 3B.

FIGS. 3A and 3B respectively illustrate detailed side perspective and top views of a first embodiment of the furcation body 30 shown as the upper and lower furcation bodies 30A, 30B in FIGS. 2A and 2B. Furcation body 30 consists of a main body 42 having a first end 44 and a second end 46 opposite the first end 44. The furcation body 30 defines a passage 48 through the furcation body 30 extending from the first end 44 to receive a fiber optic cable and provide a furcation with one or more furcated legs from a fiber optic cable extending through the second end 46. The first end 44 may include a boot 45 which is connected to the main body 42 and forms part of the passage 48 through the main body 42, which will be discussed in more detail. The furcation body 30 may be constructed out of any type of suitable material desired, including but not limited to Ultem, Lexan, Valox, etc. Likewise, furcation bodies can have any suitable shape. As illustrated in FIG. 4, the first end 44 is configured to receive and furcate a fiber optic cable containing one or more optical fibers, such as the fiber optic cable 40 illustrated in FIGS. 2A and 2B. Fiber optic cable 40 may have any size, construction, fiber count, etc. By way of example, fiber optic cable may have a round profile with a diameter such as a 1.6 millimeter, 2.0 millimeter, or 2.9 millimeter with any suitable fiber count. Of course, other variations of the furcation body and/or fiber optic cable assembly are possible.

As also illustrated in FIG. 4, one or more furcated legs 38 furcated inside the passage 48 from the fiber optic cable 40 extend from the second end 46 of the furcation body 30. The furcated legs 38 may extend through an end cap 49 that attaches to the second end 46 of the main body 42 to separate out the furcated legs 38 and to conceal the passage 48 and/or any epoxy, adhesive, or the like placed therein to secure the furcation. However, other embodiments can eliminate the end cap. Further, as illustrated in FIG. 3A, the end cap 49 contains latches 51A, 51B (latch 51B is visible in FIGS. 8A, 8B) configured to engage with latch orifice 53A, 53B, respectively, disposed on opposing sides in the main body 42 to attach the end cap 49 to the main body 42. By way of example, end cap 49 has apertures for six furcated legs 38 such as sized for 2.0 millimeter legs, but any suitable aperture size, shape, or arrangement is possible. After the furcated legs 38 are prepared, they are inserted into the second end 46 with epoxy, adhesive, or the like placed inside the furcation body 30 and cured to secure the furcated legs 38 therein.

Furcation body 30 includes several support features that may be employed to support one or more adjacent fiber optic cable assembly 28. A first support feature that can be provided is an offset structure 50, which is illustrated in FIGS. 3A and 3B. As used herein, "offset structure" means a portion of a furcation body that protrudes beyond a surface of the furcation body and has geometry that cooperates with a similar feature on another furcation body when the two furcation bodies are adjacently aligned together. As illustrated in FIGS. 3A and 3B, the offset structure 50 extends beyond a first surface 52 of the furcation body 30. The offset structure contains a U-shaped channel 54 disposed between first and second offset structures 56A, 56B that extend longitudinally down the longitudinal axis $A_1$ of the furcation body 30. The U-shaped channel 54 defines at least a portion of a fiber routing guide to support a fiber optic cable 40 and/or furcated leg routed adjacent the furcation body 30, as illustrated in FIGS. 2A and 2B for example. The first and second offset structures 56A, 56B are disposed on the same side of the furcation body 30 in this embodiment on sides 58A, 58B of the furcation body 30. However, the offset structure 50, including first and second offset structures 56A, 56B could also be located on one or more side(s) of the furcation body 30 such that additional fiber optic cable routing guides are formed. So that the offset structure 50 of the furcation body 30 can cooperate with a similar feature on another furcation body 30 to support adjacent fiber optic cable assembly 28, the first offset structure 56A in this embodiment contains a female portion 62, and the second offset member 56B contains a male portion 60. In this embodiment, the male portion 60 is provided in the form of a protrusion 64 that extends longitudinally along the second offset structure 56B. The female portion 62 is provided in the form of a channel 66 that also extends longitudinally along the first offset structure 56A. Other variations of offset structure can eliminate the snap-fit male and female feature and instead use an attachment device such as a Velcro® strap hold or attach adjacent furcation bodies together.

Figure 5:
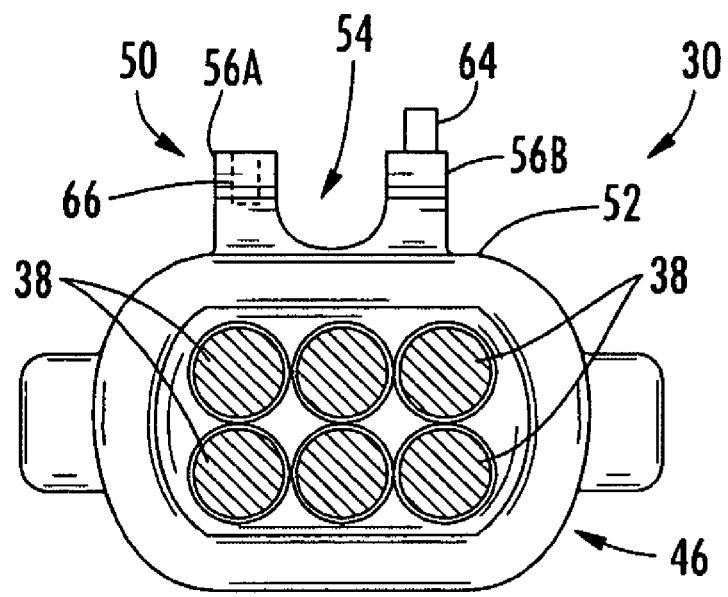
FIG. 5 illustrates a side view of the furcated leg side of the fiber optic cable assembly of FIG. 4, which includes a cross section of furcated legs within the furcation body.

To further illustrate the offset structure 50, FIG. 5 illustrates a front view of the furcation body 30 as part of a fiber optic cable assembly 28 from the second end 46 of the furcation body 30. As shown therein, the offset structure 50 sits atop the first surface 52 of the furcation body 30. The offset structure 50 may be a separate structure attached to the furcation body 30 or may be an integrated part of the furcation body 30 formed by a one-piece mold, as provided in this example. A cross-section of the furcated legs 38 disposed inside the passage 48 is also shown.

Figure 6:
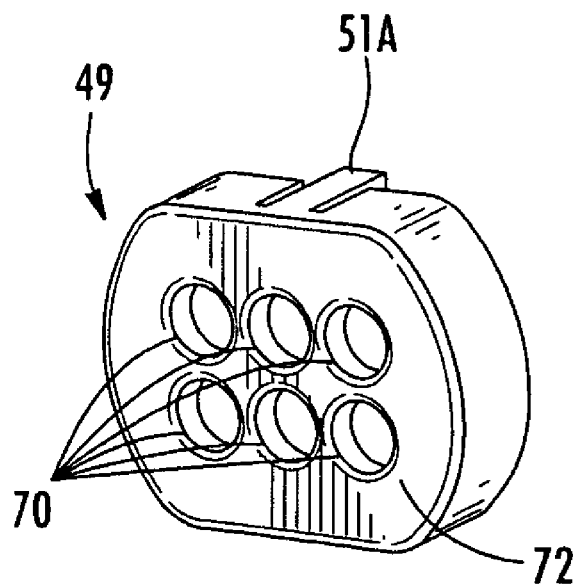
FIG. 6 illustrates a furcated leg side end cap for the furcation body of FIGS. 3A and 3B.
Figure 7:
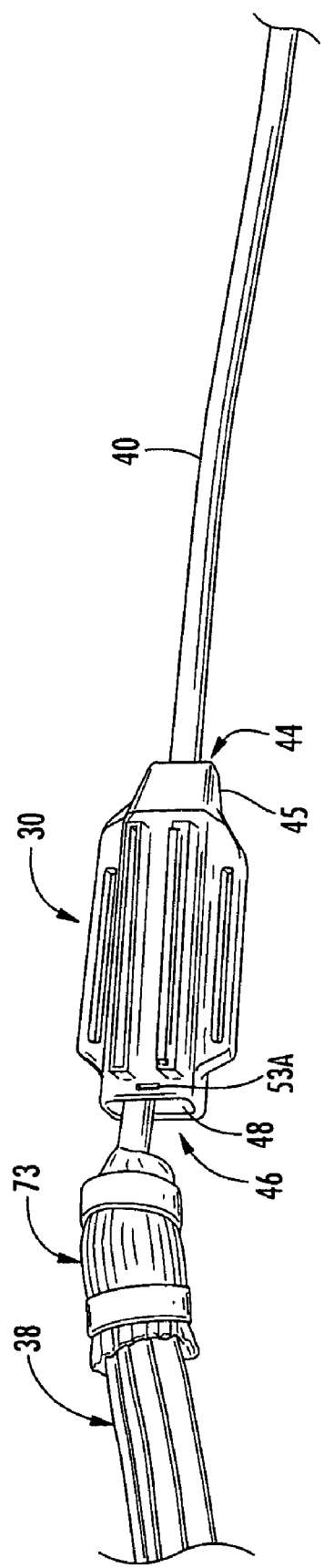
FIG. 7 illustrates a partially assembled view of the furcation of the fiber optic cable assembly of FIGS. 3A and 3B.

End cap 49 illustrated in FIG. 6 can be used to receive and spread out the furcated legs 38 from each other and to cap off the passage 48 on the second end 46 of the furcation body 30 to limit access and/or hide epoxy, adhesive or other bonding material contained inside the passage 48. Moreover, the end cap keeps the furcation within the furcation body 30. The furcated legs 38 each extended through respective orifices 70 disposed in an end face 72 of the end cap 49. The end cap 49 can then be slipped over the second end 46 of the furcation body 30 and secured via latches 51A, 51B (shown in FIGS. 8A and 8B) to the latch orifices 53A, 53B, respectively (see FIG. 3A), or in any other appropriate manner desired. The outer dimensions of the second end 46 are smaller than the inner dimensions of the end cap 49 so that the end cap 49 can be slipped over the top of the second end 46 of the furcation body 30, but other variations are possible. An epoxy or other adhesive may be employed to secure the end cap 49 to the second end 46, or the end cap 49 may be secured through tension or friction fit with the second end 46. In a similar manner, the first end 44 of the furcation body 30 may have an end piece such as illustrated and discussed in FIG. 10C. FIG. 7 shows a partially assembled view of fiber optic cable assembly 28 with the fiber optic cable 40 extending through a boot 45 and into the passage 48 of the furcation body 30, and a furcation 73 of the optical fibers in the fiber optic cable 40 into one or more furcated legs 38.

Figure 8A:
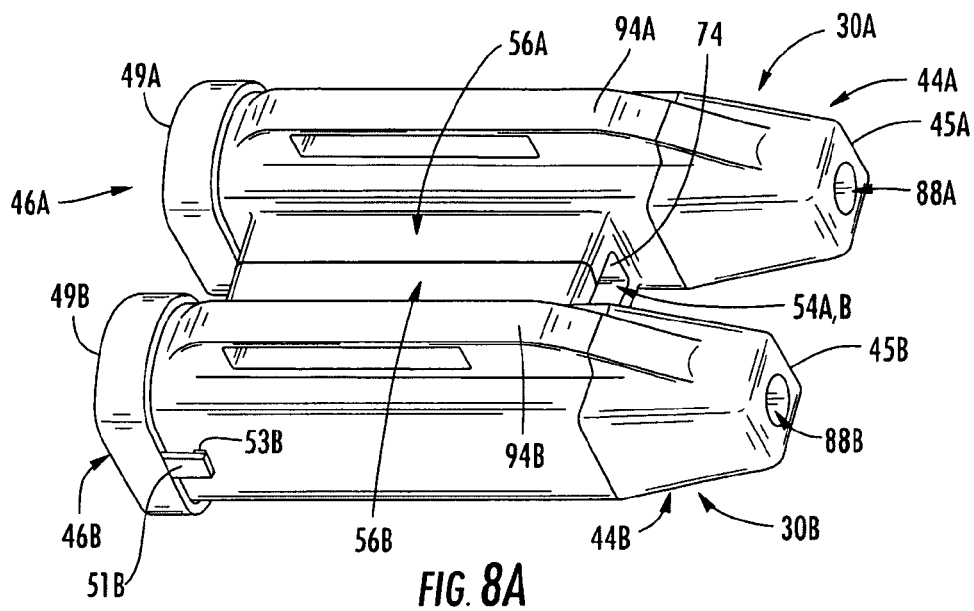
FIGS. 8A and 8B illustrate side perspective and top views, respectively, of two furcation bodies of FIGS. 3A and 3B cooperatively connected to provide support.
Figure 8B:
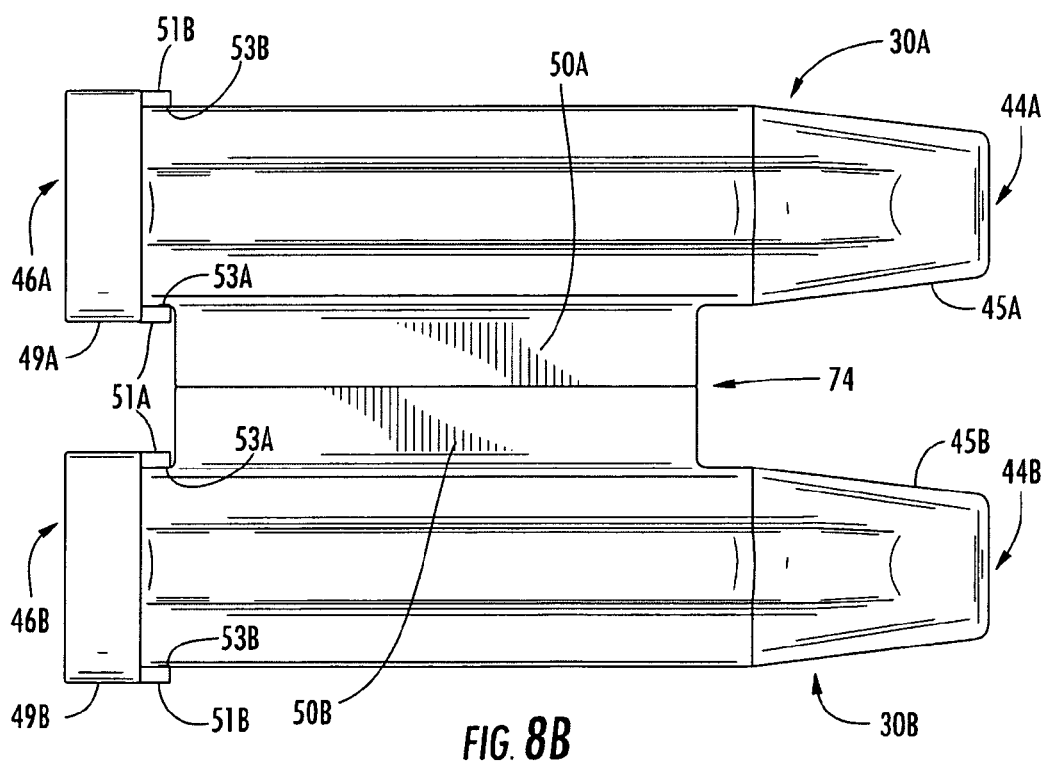

FIGS. 8A and 8B respectively illustrate side perspective and top views of two adjacent furcation bodies 30 whose offset structures 50 are connected together to support fiber optic cable assemblies. The structure of the attached furcation bodies 30 is like that illustrated in FIGS. 2A and 2B. In this example, 'A' and 'B' designations are made to element numbers in FIGS. 8A and 8B to signify the two different furcation bodies 30A, 30B, but note that each furcation body 30A, 30B is the same structure in this embodiment, although not required, and their offset structures 50A, 50B cooperate with each other when the two furcation bodies 30A, 30B are adjacently aligned together.

As illustrated in FIGS. 8A and 8B, two furcation bodies 30A cooperate and are aligned together with their offset structures 50A, 50B connected together. Specifically, the male portions 60A, 60B (not shown) of the offset structures 56A, 56B are inserted into the female portions 62B, 62A of the offset structures 56A, 56B. When the furcation bodies 30A, 30B are aligned with each other, as illustrated in FIGS. 8A and 8B, each protrusion 64A, 64B aligns with its corresponding channels 66B, 66A (see FIG. 9). Further, both U-shaped channels 54A, 54B are aligned with each other to provide an enclosed passage, which forms an area suitable for routing at least one fiber optic cable and/or furcated leg and thus forms a fiber routing guide 74 that is enclosed. As illustrated in FIG. 2B, some of the fiber optic cables 40 are routed from fiber optic cable assemblies 28 downstream into the fiber routing guide 74 formed when the furcation bodies 30A, 30B are connected to each other. This provides additional support for fiber optic cables 40 that are routed to inhibit cable sag.

Figure 9:
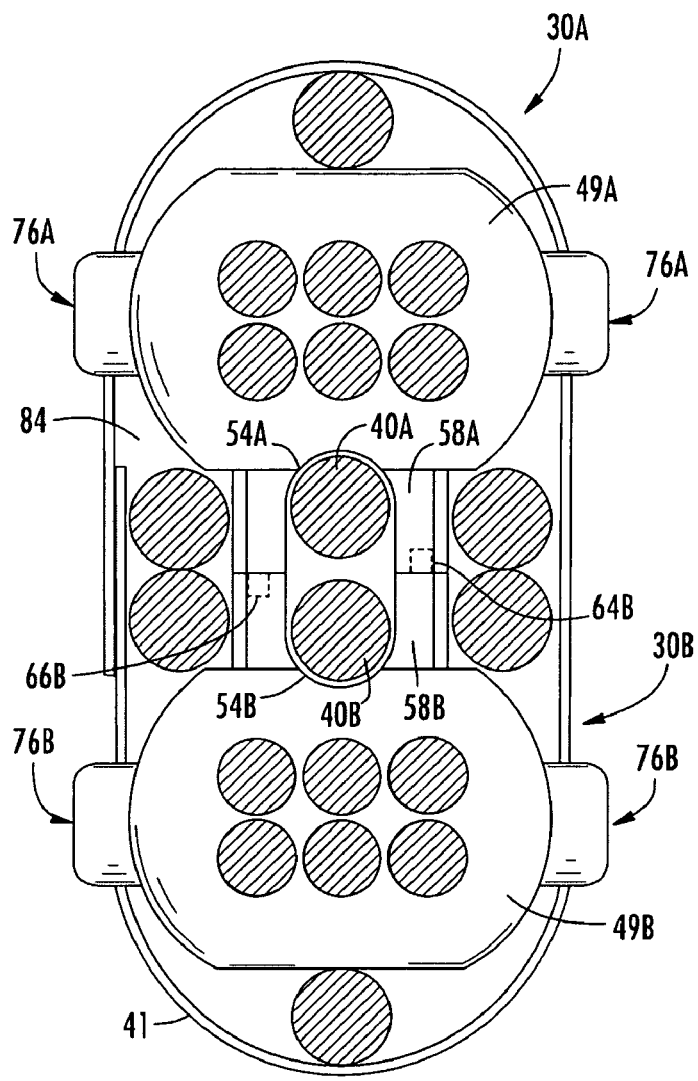
FIG. 9 illustrates a side view of fiber optic cable assemblies whose furcation bodies are cooperatively connected according to the configuration illustrated in FIGS. 8A and 8B.

FIG. 9 illustrates a side view of furcation bodies 30A, 30B illustrated in FIGS. 8A and 8B when supporting the fiber optic cable assemblies 28A, 28B to further illustrate features when installed. As shown therein, two fiber optic cables 40A, 40B are routed through the fiber routing guide 74 formed when the two furcation bodies 30A, 30B are abutted to each other. The furcation bodies 30A, 30B also contain additional, optional support structures in the form of attachment features 76A, 76B that can also be provided in the furcation bodies 30A, 30B and assist in supporting fiber optic cable assemblies 28A, 28B. In this embodiment, a first attachment feature 76A and a second attachment feature 76B are disposed on the opposite sides of the furcation body 30. Attachment device 41 illustrated in FIGS. 2A and 2B and previously discussed above is shown inserted through the attachment features 76A, 76B to further support holding the furcation bodies 30A, 30B and their offset structures 56A, 56B to each other and to provide additional cable management routing for one or more fiber optic cables 40 and/or furcation legs for one or more fiber optic cable assemblies 28.

Figure 9A:
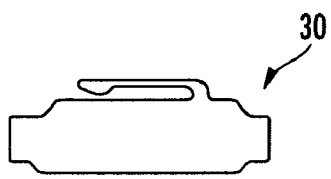
FIGS. 9A-9D illustrates a side profiles of furcation bodies having alternative attachment features.
Figure 9B:
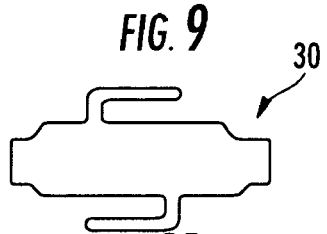
Figure 9C:
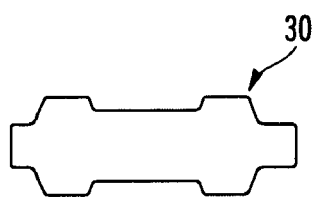
Figure 9D:
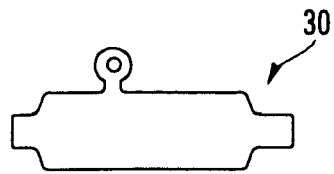
Figure 10A:
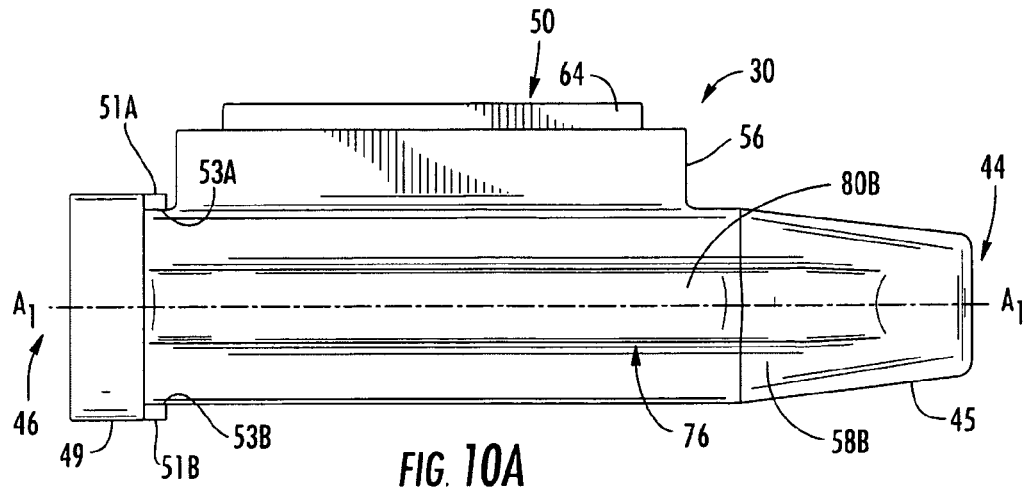
FIGS. 10A and 10B illustrate side and bottom views, respectively, of the furcation body of FIGS. 3A and 3B.
Figure 10B:
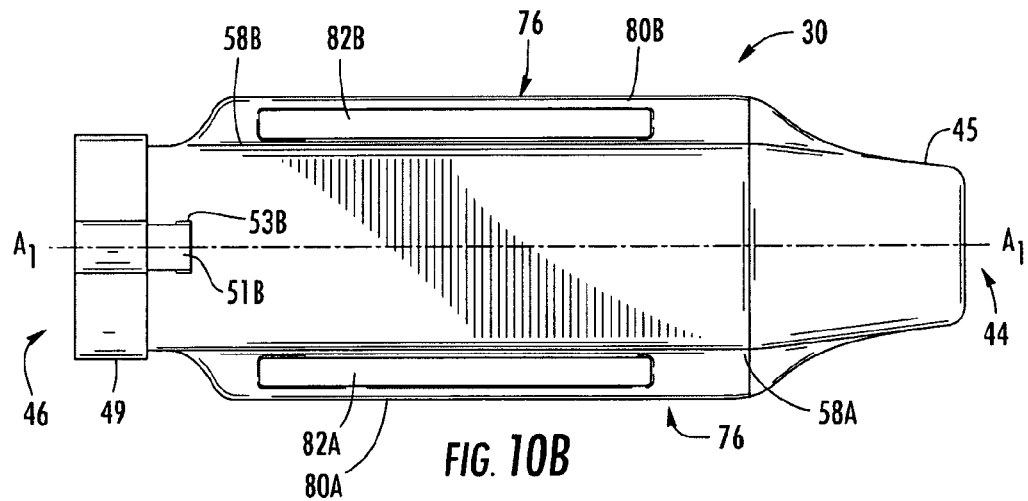

FIGS. 10A and 10B provide more detail regarding the attachment features 76A, 76B. Attachment features 76 are disposed in the furcation body 30 in the form of a first attachment feature 76A on the first side 58A of the furcation body 30 and a second attachment feature 76B on the opposite, second side 58B of the furcation body 30. The first and second attachment features 76A, 76B are integrated into the furcation body 30 in a one-piece mold in this example, but could be provided as a separate, connected structure. In this embodiment, the first and second attachment features 76A, 76B are provided in the form of first and second wing structures 80A, 80B that extend from the sides 58A, 58B from the furcation body 30 in an axis substantially orthogonal to the longitudinal axis $A_1$ of the furcation body 30. Loops are formed in the first and second wing structures 80A, 80B by a channel orifice 82A, 82B being disposed within the first and second wing structures 80A, 80B, such as through an extrusion process. In this manner, the attachment device 41 or other attachment device can be routed through the channel orifices 82A, 82B to further secure and/or support the furcation body 30, and as a result, the fiber optic cable assembly 28 of which the furcating body 30 is a part. When two furcation bodies 30A, 30B are connected to each other, as illustrated in FIG. 9 as an example, the space 84 formed between the attachment device 41 and the furcation bodies 30 provides additional cable management routing guides that can be used to guide and support fiber optic cables 40 and/or furcation legs and in turn support the fiber optic cable assemblies 28 of which fiber optic cables 40C are a part. In other words, all of the fiber optic cables and/or furcation legs are neatly routed adjacent to the furcation bodies to inhibit sag and thereby stiffening all of the fiber optic cable assemblies being routed to the blade, module, or the like. This also provides improve access, airflow, and inhibits tangling of cable assemblies. Additionally, as illustrated in FIG. 9, fiber optic cables 40D can be disposed against the furcation bodies 30A, 30B with the attachment device 41 attached to the attachment features 76A, 76B such that the fiber optic cables 40D are held secured to the furcation bodies 30A, 30B. Other variations of attachment features 76 are possible as shown FIGS. 9A-9C, which respectively depict side views of attachment features a slip-loop (i.e., one side of the loop is a flap that is not attached to the furcation body), one or more hooks, a recessed region, and/or a loop attached or provided as part of the furcation body 30. Of course, other features are possible for attachment features 76. Moreover, the attachment device can be used without having attachment features.

Figure 10C:
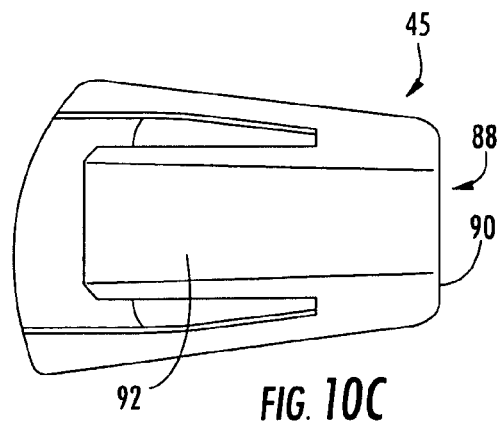
FIG. 10C illustrates a fiber cable side boot for the furcation body of FIGS. 3A and 3B.

FIG. 10C along with FIGS. 8A and 8B illustrate a boot 45 that may be placed about the first end 44 of the furcation body 30 to receive the fiber optic cable 40 and to cap off the passage 48 on the first end 44 of the furcation body 30 to prevent access and/or hide epoxy or other bonding material contained inside the passage 48. During manufacture of the fiber optic cable assembly 28, the fiber optic cable 40 is extended through an orifice 88 disposed in an end face 90 of the boot 45 as illustrated in FIG. 7. The boot 45 can then be slipped over the first end 44 of the furcation body 30 and secured in an appropriate manner. In this example, the outer dimensions of the first end 44 are smaller than the inner dimensions of the boot 45 that the boot 45 can be slipped over the top of the first end 44. The boot could have other variations such as being integrated into the furcation body or eliminated.

An epoxy or other adhesive may be employed to secure the boot 45 to the first end 44 or may be secured through tension fit between the two. The boot 45 also contains protrusion structures 92 on each side of the boot 45 that extend over the back portions 94A, 94B (see FIG. 8A) of the first and second winged structures 80A, 80B to provide a contiguous other surface of the first and second winged structures 80A, 80B when the boot 45 is placed over the top of the first end 44.

Figure 11A:
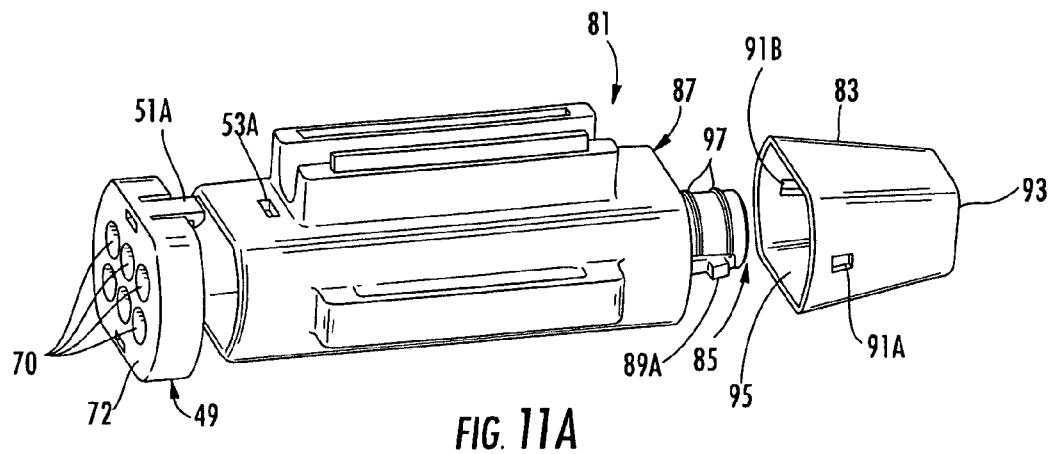
FIGS. 11A-11C illustrate an alternative furcation body and boot structure to receive a fiber optic cable.
Figure 11B:
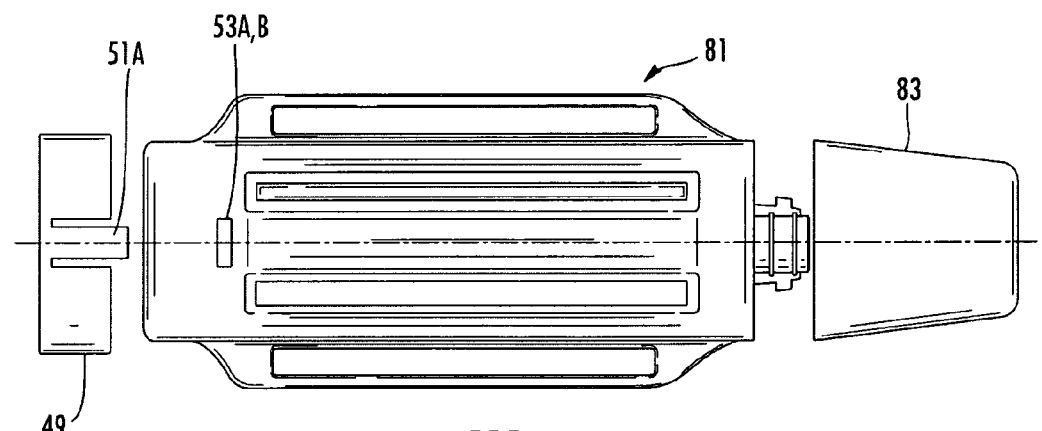
Figure 11C:
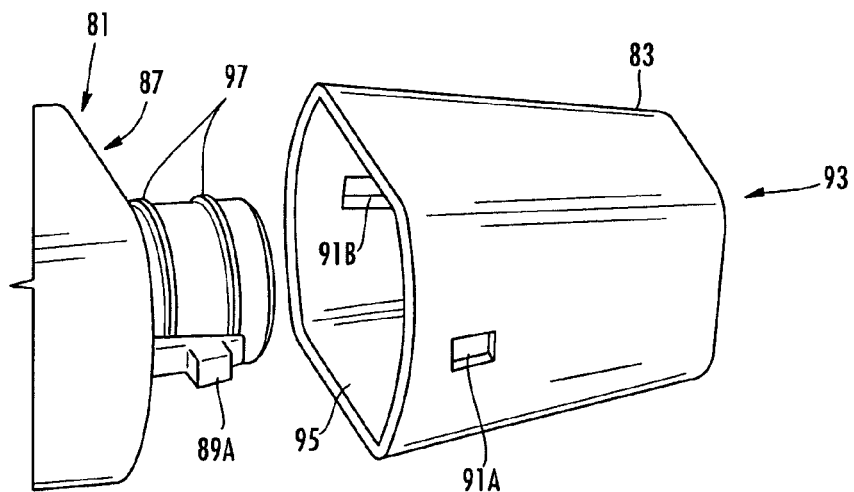

FIGS. 11A-11C illustrate a furcation body 81 that is a variant of furcation body 30. As shown, an external flange 85 is provided as part of the furcation body 81 that extends from a rear section 87 of the furcation body 81 to receive a boot 83. The external flange 85 contains two latches 89A, 89B that are received into latch orifices 91A, 91B disposed in the boot 83 to secure the boot 83 to the furcation body 81. A fiber optic cable 40 can be inserted into a first end 93 and passage 95 and into the external flange 85 to prepare the fiber optic cable 40 for furcation. The external flange 85 provides a guide for inserting the fiber optic cable 40 and may make manufacturing of the fiber optic cable assembly 28 efficient and convenient. The external flange 85 contains one or more shoulders 97 that may be used to provide a clamp or crimp body to secure the fiber optic cable 40 within the external flange 85 and in the furcation body 81, although the fiber optic cable 40 may be secured within the external flange 85 and furcation body 81 via other means, including but not limited to an epoxy or adhesive. The boot 83 may be constructed out of any type of material, including but not limited to Ultem, Lexan®, Valox®, Nylon, and Santoprene. Other features and variations discussed with respect to furcation body 30 are applicable for the furcation body 81 and the other furcation bodies disclosed herein.

Figure 12A:
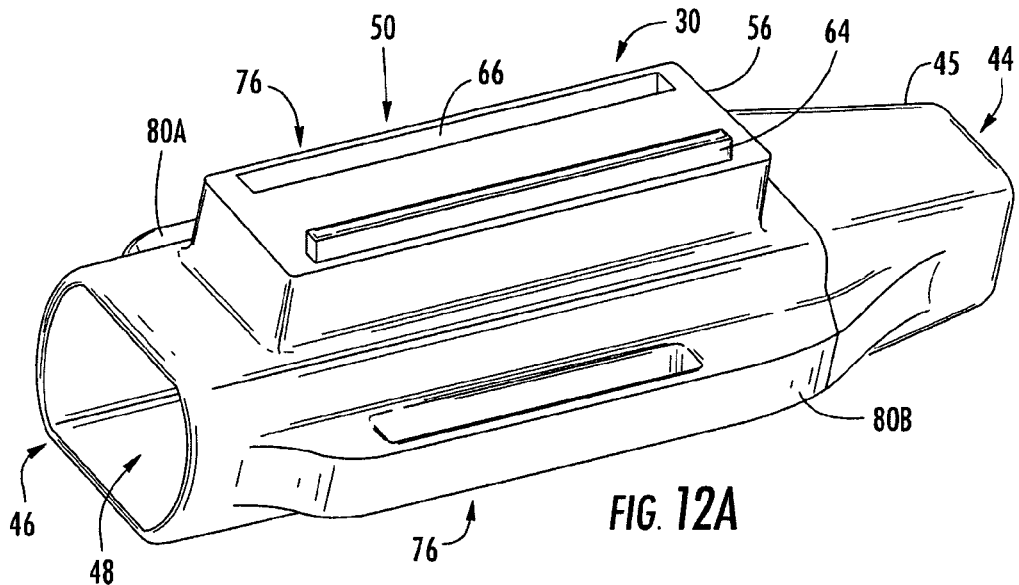
FIGS. 12A and 12B illustrate side perspective and front views, respectively, of an alternate embodiment of a furcation body having one or more support features.
Figure 12B:
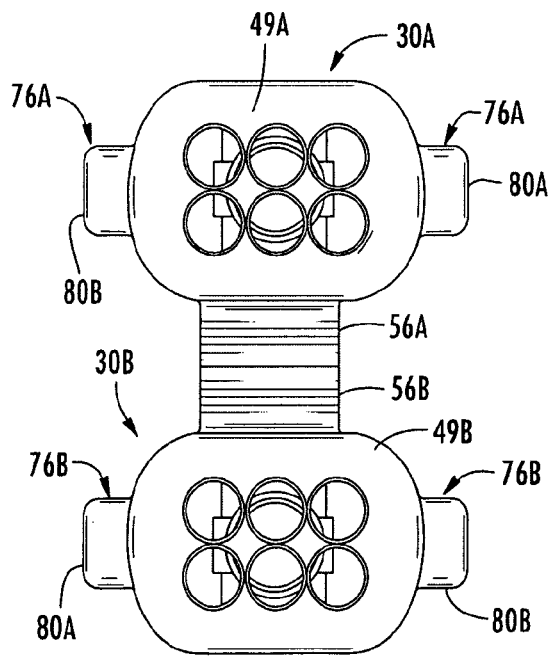

Other embodiments and variations of fiber optic cable assemblies are possible. For example, FIGS. 12A and 12B illustrate another furcation body 30 similar to the furcation body of FIGS. 2A-10C, but without the U-shaped channel 54 disposed between the offset structures 56A, 56B. This furcation body 30 does not contain latch orifices 53A, 53B for an end cap to be secured onto the second end 46 of the furcation body 30. Instead, the end cap 49 fits onto the furcation body 30 via a friction fit. Also, the offset structure 50 is provided as one solid member with extrusions for channels, other than the channels 66 of the offset structure 50 as part of the attachment feature of the furcation body 30A to align and attache to another furcation body 30B, as illustrated in FIG. 12B. Other features and variations for this furcation body 30 are also possible as discussed.

Figure 13A:
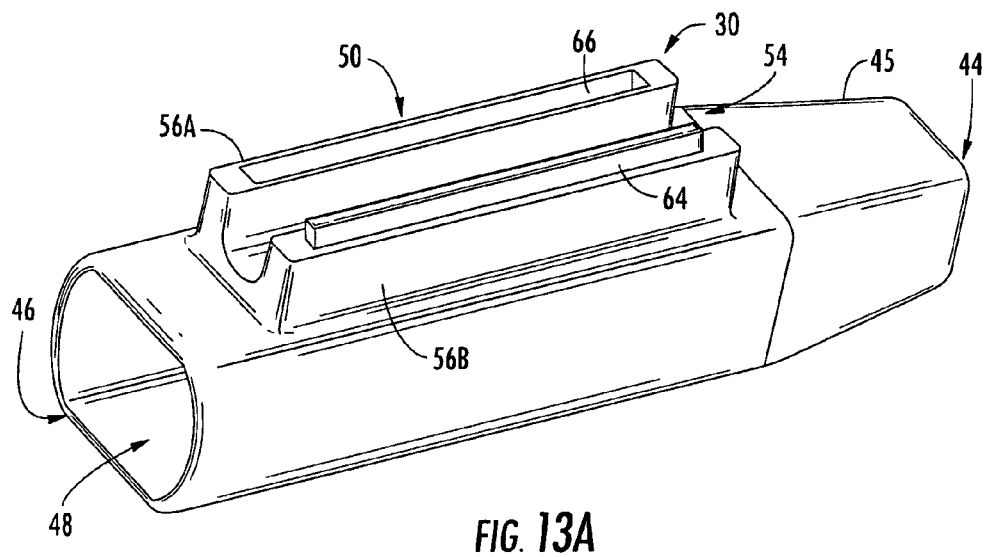
FIGS. 13A and 13B illustrate side perspective and front views, respectively, of another alternate embodiment of a furcation body having one or more support features.
Figure 13B:
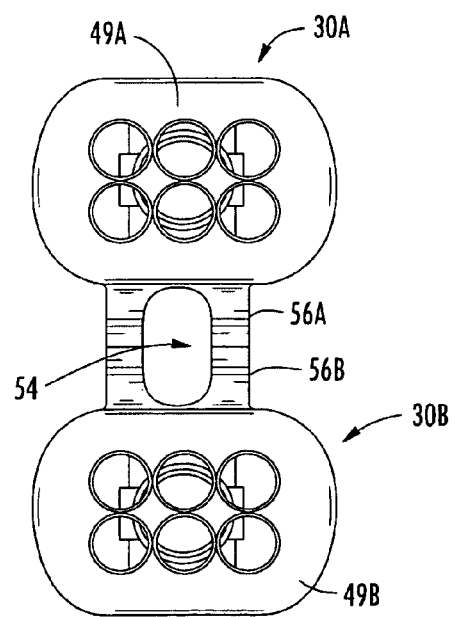

FIGS. 13A and 13B illustrate still another variation for furcation body 30. In this variation, the attachment features 76 and latch orifices 53A, 53B are not included. The offset structure 50 is relied on solely to secure the furcation bodies 30A, 30B together in this embodiment. The U-shaped channel 54 is included, but could also be not included like provided in the variation of the furcation body 30 in FIGS. 12A-12B.

Figure 14A:
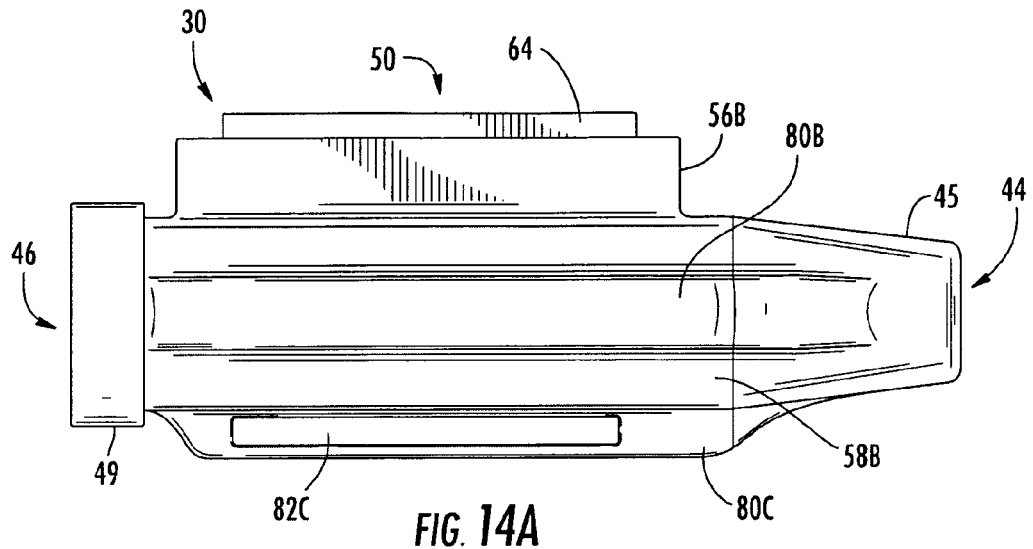
FIGS. 14A and 14B illustrate side perspective and front views, respectively, of another alternate embodiment of a furcation body having one or more support features.
Figure 14B:
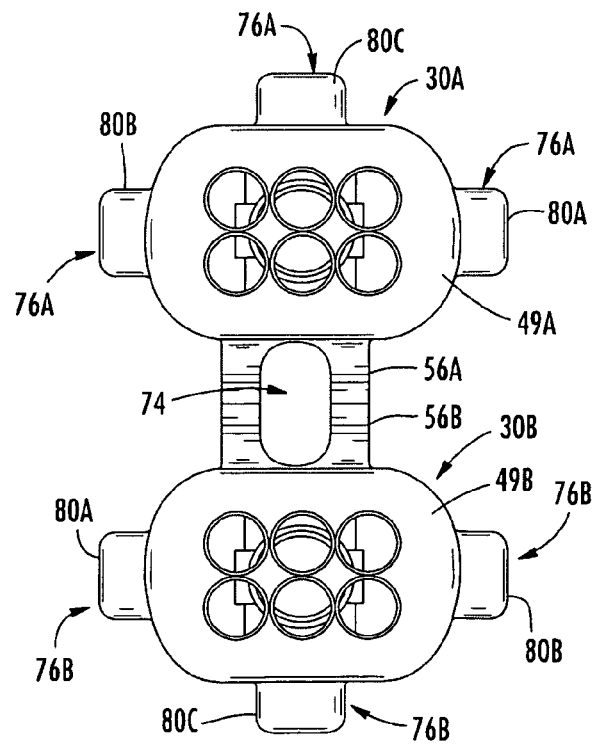

FIGS. 14A and 14B illustrate yet another variation of the furcation body 30. In this variation, an additional third attachment feature 76 in the form of a bottom winged structure 80C is additionally included. The winged structure 80C has the same attributes as the winged structures 80A, 80B disposed on the sides 58A, 58B of the furcation body 30 in this example, but such is not a requirement. The additional winged structure 80C could be of different dimensions, for example. As illustrated in FIG. 14B, when two of these furcation bodies 30 are aligned and attached to each other, the additional winged structures 80C appear on the top and bottom to provide additional routing guides for the attachment device 41 or other attachment device that may be disposed through the channel orifices 82A-82C of the winged structures 80A-80C. In still further embodiments of the fiber optic assemblies, the furcation body 30 could have a singe attachment feature.

Figure 15A:
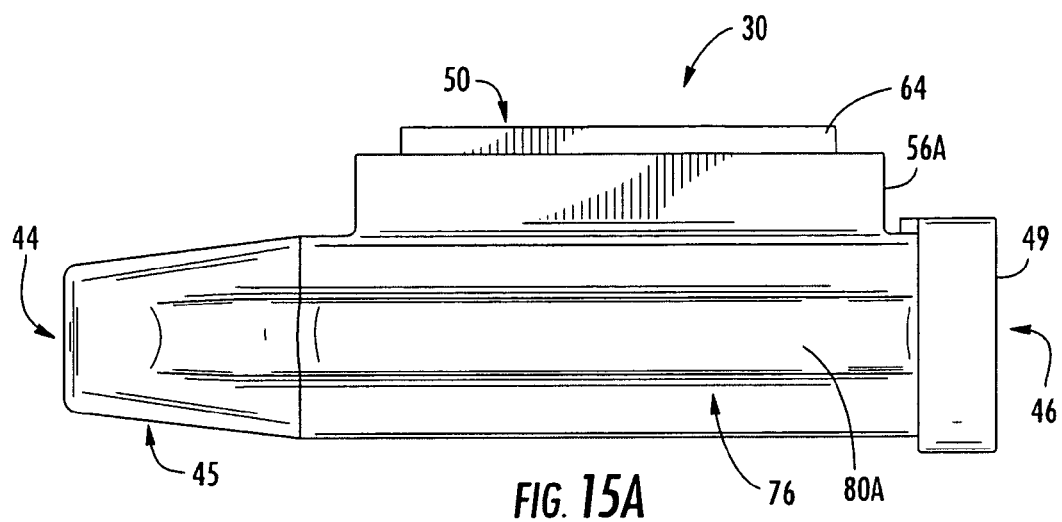
FIGS. 15A and 15B illustrate side and front views, respectively, of another alternate embodiment of a furcation body having one or more support features.
Figure 15B:
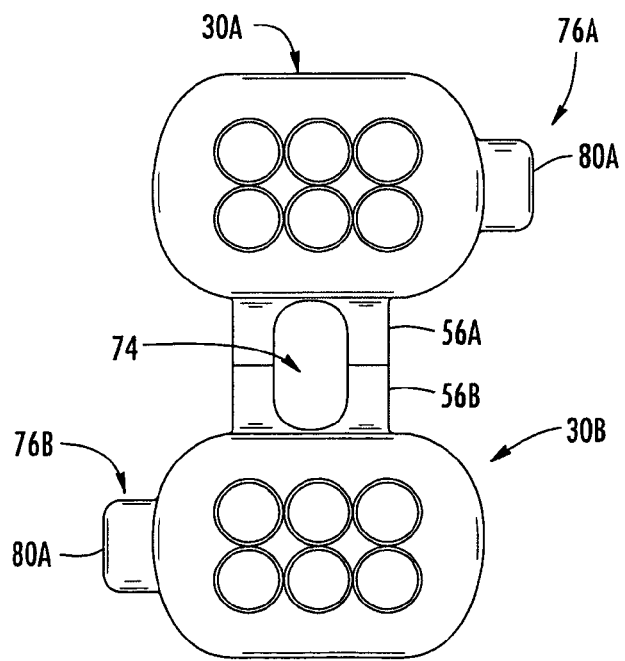

FIGS. 15A and 15B illustrate yet another variation of the furcation body 30. In this variation, an only one winged structure 80A is provided for the attachment feature 76. As illustrated in FIG. 15B, when two of these furcation bodies 30 are aligned and attached to each other, the winged structures 80A are disposed on opposite sides from each other. Two winged structures 80A may provide a sufficient routing guide to allow the attachment device 41 or other attachment device to secure the two furcation bodies 30A, 30B to each other and to provide fiber optic cable management like that illustrated in FIG. 9. Of course, the attachment feature could be located on any side, have any suitable shape, etc. Additionally the furcation bodies could have a labeling scheme for the craft.

Figure 16:
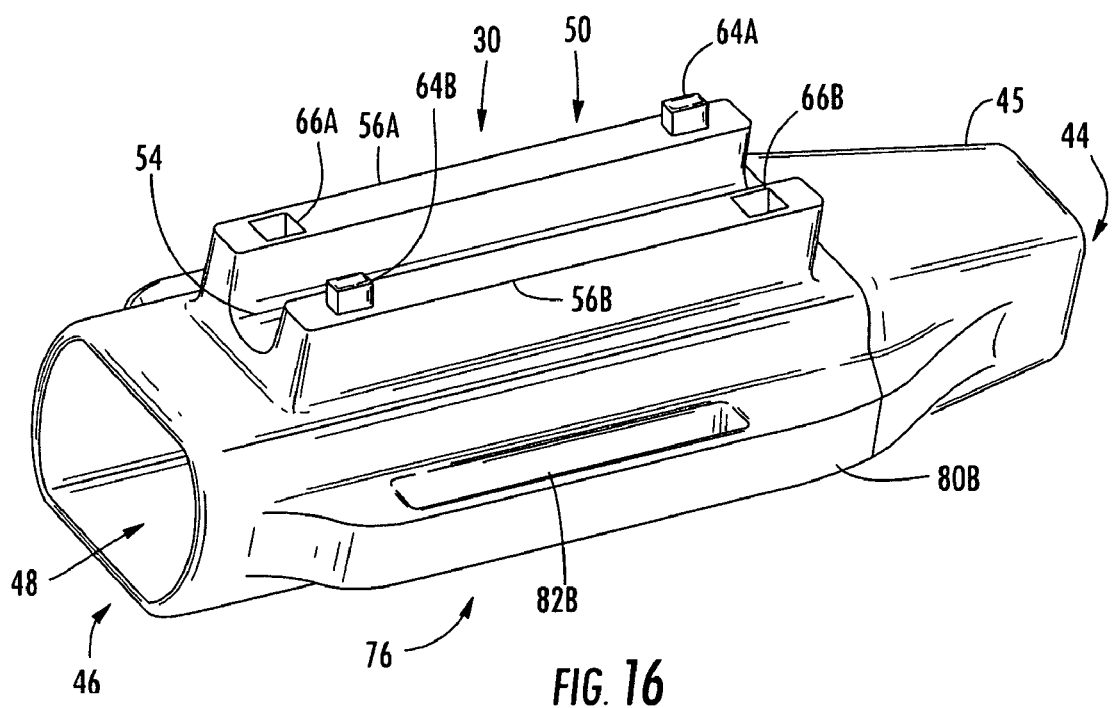
FIG. 16 illustrates a side perspective view of another alternate embodiment of a furcation body having one or more support features.

FIG. 16 is another variation of the furcation body 30 for fiber optic assemblies disclosed herein. In this variation, the protrusions 64 and orifice channel 66 of the offset structure 50 are not provided as single elongated protrusions and channels and exclusively provided on either the first or second offset structures 56A, 56B. Rather, the protrusions 64A, 64B and orifice channels 66A, 66B are disposed between the first and second offset structures 56A, 56B on opposite corners from each other as illustrated in FIG. 16. In this manner, the protrusions 64A, 64B and cooperative channels 66A, 66B cooperate with each other to provide anti-rotation of one furcation body 30A about the other furcation body 30B when aligned and attached to each other. Further, less material is expended providing the protrusions 64A, 64B which may reduce the costs of manufacture of the furcation body 30.

Figure 17A:
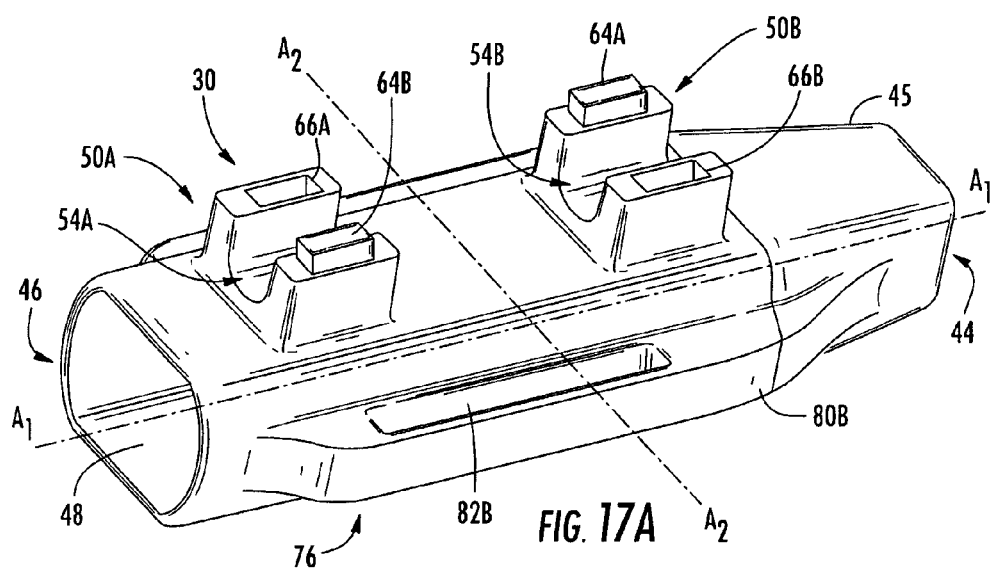
FIGS. 17A and 17B illustrate a side perspective and side views, respectively, of a furcation body having one or more support features according to another alternate embodiment.
Figure 17B:
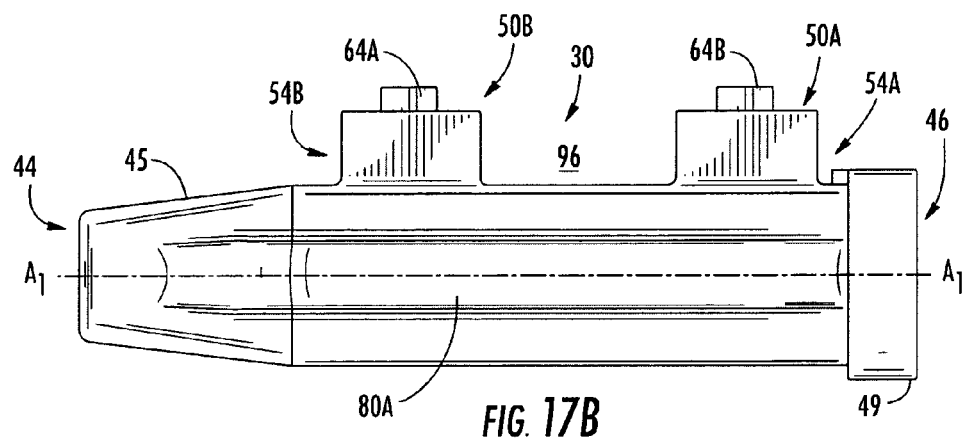

FIGS. 17A and 17B illustrate another variation of the furcation body 30 having protrusions 64A, 64B and channels 66A, 66B disposed between the first and second offset structures 56A, 56B on opposite corners from each other. However, in this variation, the offset structure 50 is provided as two separate offset structures 50A, 50B instead of one offset structure 50 like shown by FIG. 16, wherein two U-shaped channels 54A, 54B are provided in each offset structure 50A, 50B. This may save material used to provide the offset structures 50A, 50B in the furcation body 30 and also provide additional space 96 (FIG. 17B) in routing fiber optic cables 40 along both the longitudinal axis $A_1$ of the furcation body 30 as well as a latitudinal axis $A_2$ of the furcation body 30 as illustrated in FIG. 17A.

Figure 18A:
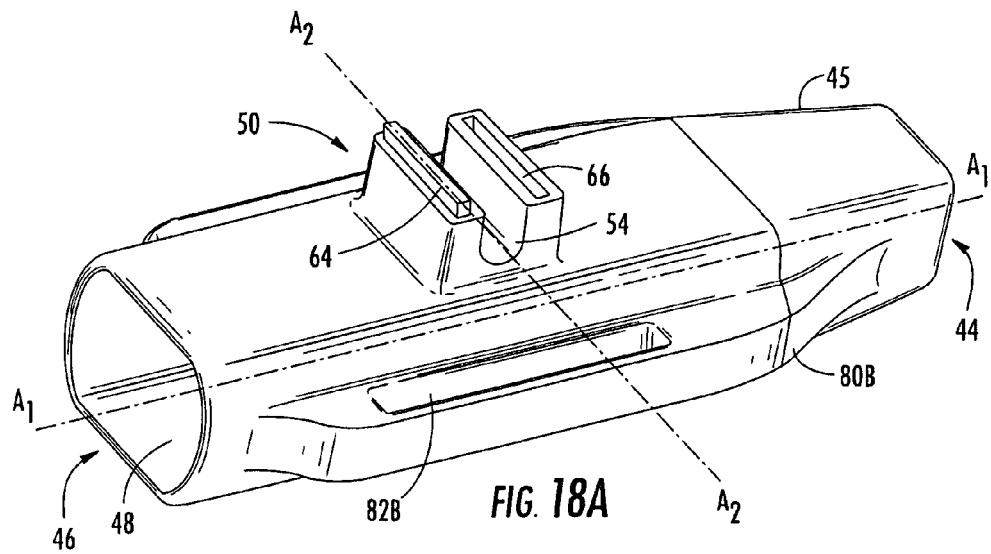
FIGS. 18A-18C illustrate side perspective, side, and front views, respectively, of a furcation body having one or more support features according to another alternate embodiment.
Figure 18B:
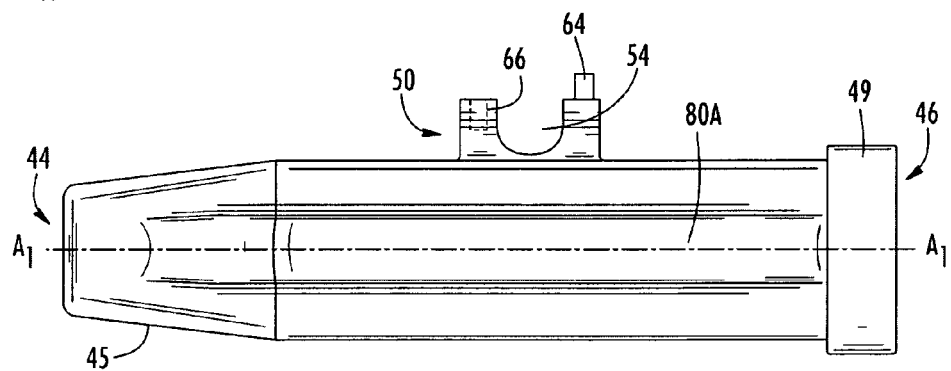
Figure 18C:
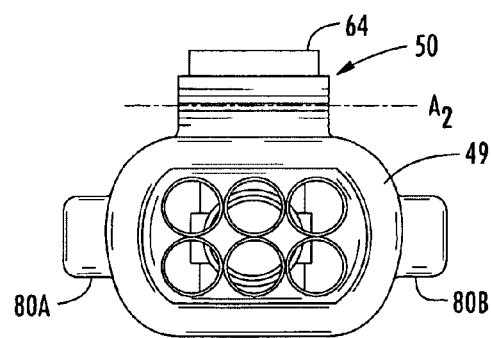

If it is desired to route fiber optic cables 40 adjacent the furcation body 30 along latitudinal axis $A_2$ of the furcation body $A_1$, the offset structure 50 could be rotated ninety (90) degrees from the embodiments disclosed above to align the U-shaped channel 54 along the latitudinal axis $A_2$, like illustrated in FIGS. 18A-18C. Moreover, a plurality of offset structures could be provided in this axis if desired. Again, other features and variations are also possible.

Figure 19A:
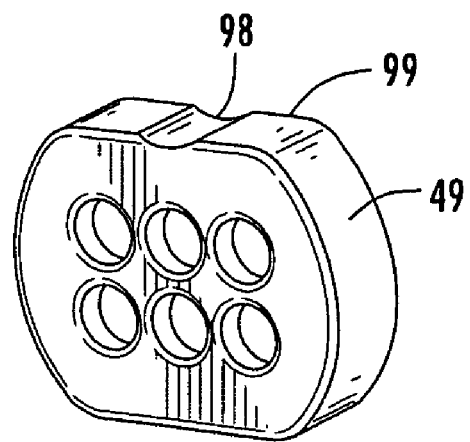
FIGS. 19A-19B illustrate a furcated leg side end cap and furcation body, respectively, having one or more support features according to another alternate embodiment.
Figure 19B:
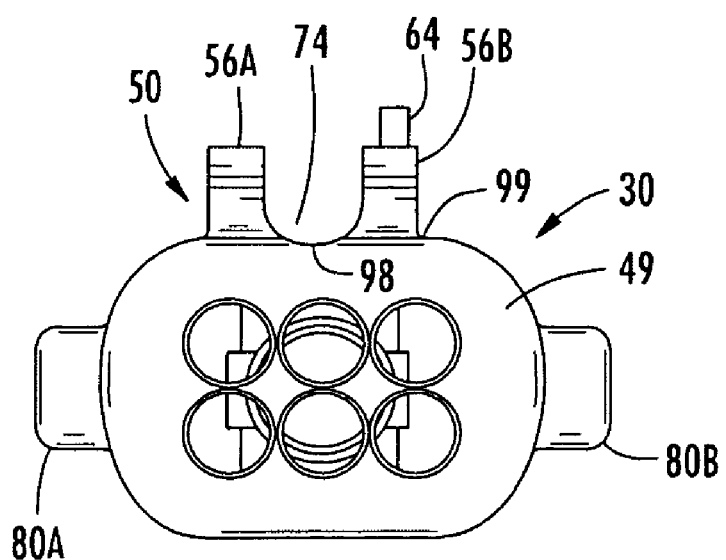

FIGS. 19A and 19B illustrate another variation of the end cap 49 for the second end 46 of the furcation body 30, wherein a U-shaped groove 98 is disposed on a top side 99 of the end cap 49 to provide a resting channel for a fiber optic cable 40 routed through the offset structure 50 to rest within. FIG. 19B shows this variation of the end cap 49 installed on the second end 46 of the furcation body 30. Otherwise the top side 99 of the end cap 49 may invade a portion of the space formed by the U-shaped channel 54 such that a fiber optic cable 40 routed through the offset structure 50 and the U-shaped channel 54 may not be able to lay flat without incurring a change in disposition when disposed across the top side 99 of the end cap 49. In this manner, the fiber optic cable 40 is less susceptible to attenuation that may come from bending of the fiber optic cable 40 although an end cap like that described previously above should not adversely attenuate the fiber optic cable 40.

Figure 20A:
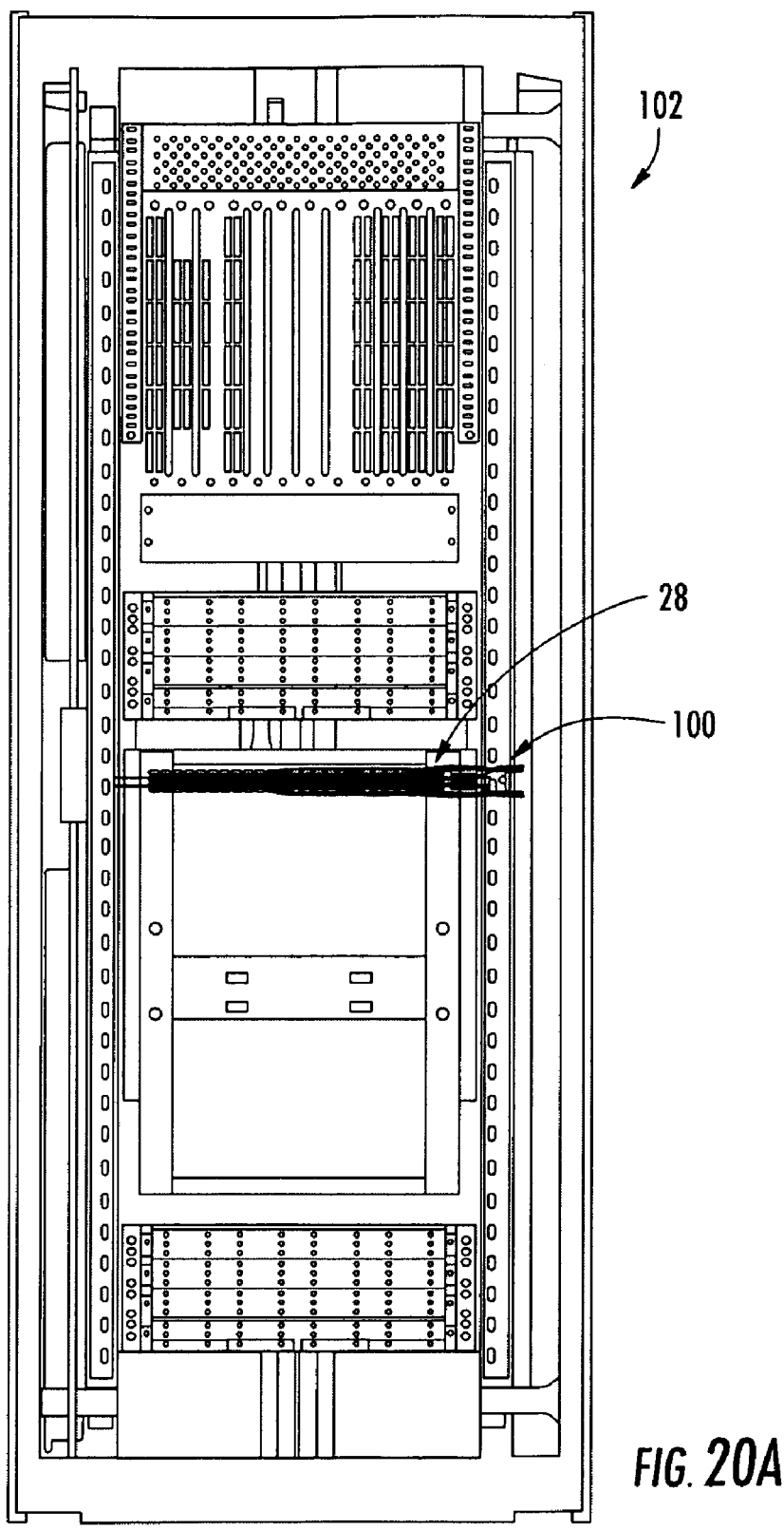
FIG. 20A is a front view of storage area network (SAN) equipment distribution area (EDA) and main distribution area (MDA) cabinets.
Figure 20B:
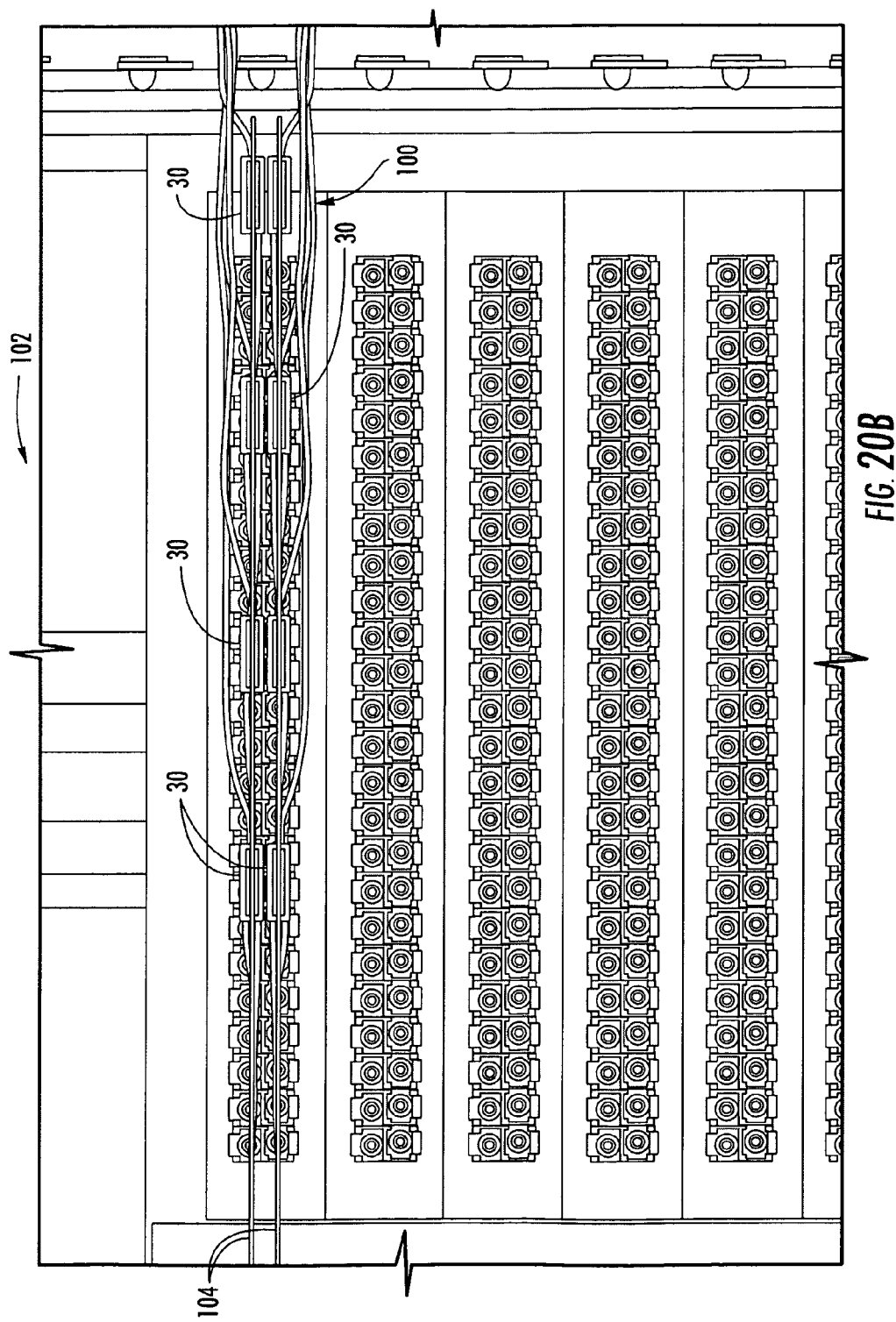
FIG. 20B is a partial elevation view of the EDA cable assemblies routed to the SAN equipment of FIG. 20A employing furcations having at least one support feature supported by a support rod.
Figure 20C:
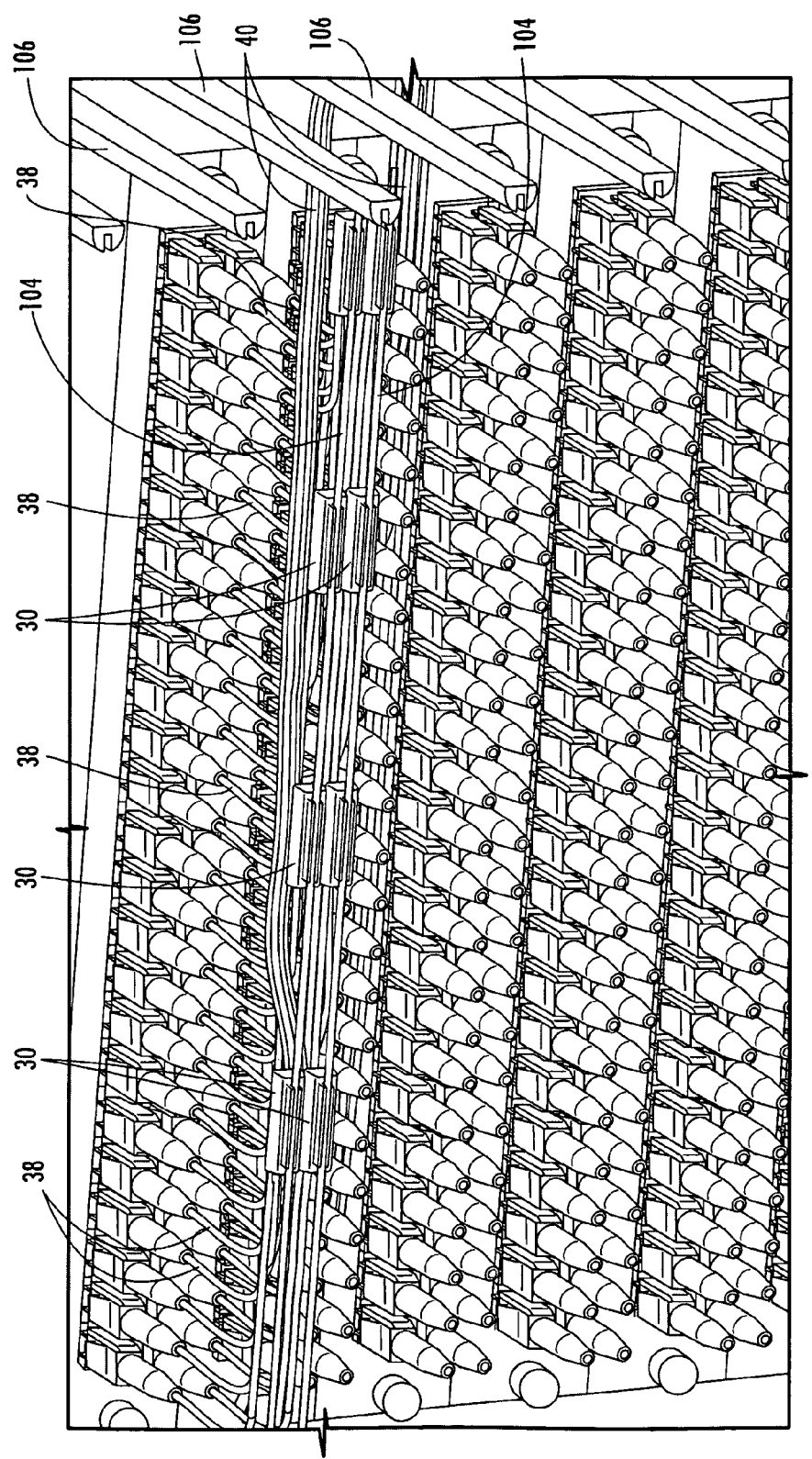
FIG. 20C is a front elevation of the EDA cable assemblies routed to the SAN equipment in FIG. 20B.

FIGS. 20A-20C illustrate another embodiment whereby fiber optic cable assemblies 28 are provided that include furcation bodies 30 for cable management and support. In this example, a storage area network (SAN) is provided wherein fiber optic equipment 100 is arranged horizontally in an equipment distribution area (EDA) in a fiber optic equipment rack 102 horizontally similar to that provided in FIGS. 2A and 2B. However, as illustrated in FIG. 20B and 20C, furcation bodies 30 are not attached to each other. Instead, to support the EDA fiber optic cable assemblies 28 of which the furcation bodies 30 are a part, the furcation bodies 30 are secured to a support rod 104 that extends horizontally across the front of the fiber optic equipment 100. More specifically, as illustrated in FIG. 20C, the U-shaped channel 54 provided in the offset structure 50 of the furcation body 30 receives the support rod 104. The support rod 104 is fixedly attached to the fiber optic equipment rack 102 via support arms 106. In this manner, the fiber optic cable assemblies 28 and their fiber optic cables 40 are supported and reduced or prevented from sagging into adjacent columns of space or other fiber optic interconnections. Because the furcation bodies 30 in this embodiment do not attach to each other, the protrusions 64 and channels 66 do not have to be provided in the offset structure 50, although such is not prohibited. For example, it may be desirable to manufacture one type of furcation body that can be attached to a support rod as well as another furcation body, thereby increasing the different types of installation deployments.

Figure 21:
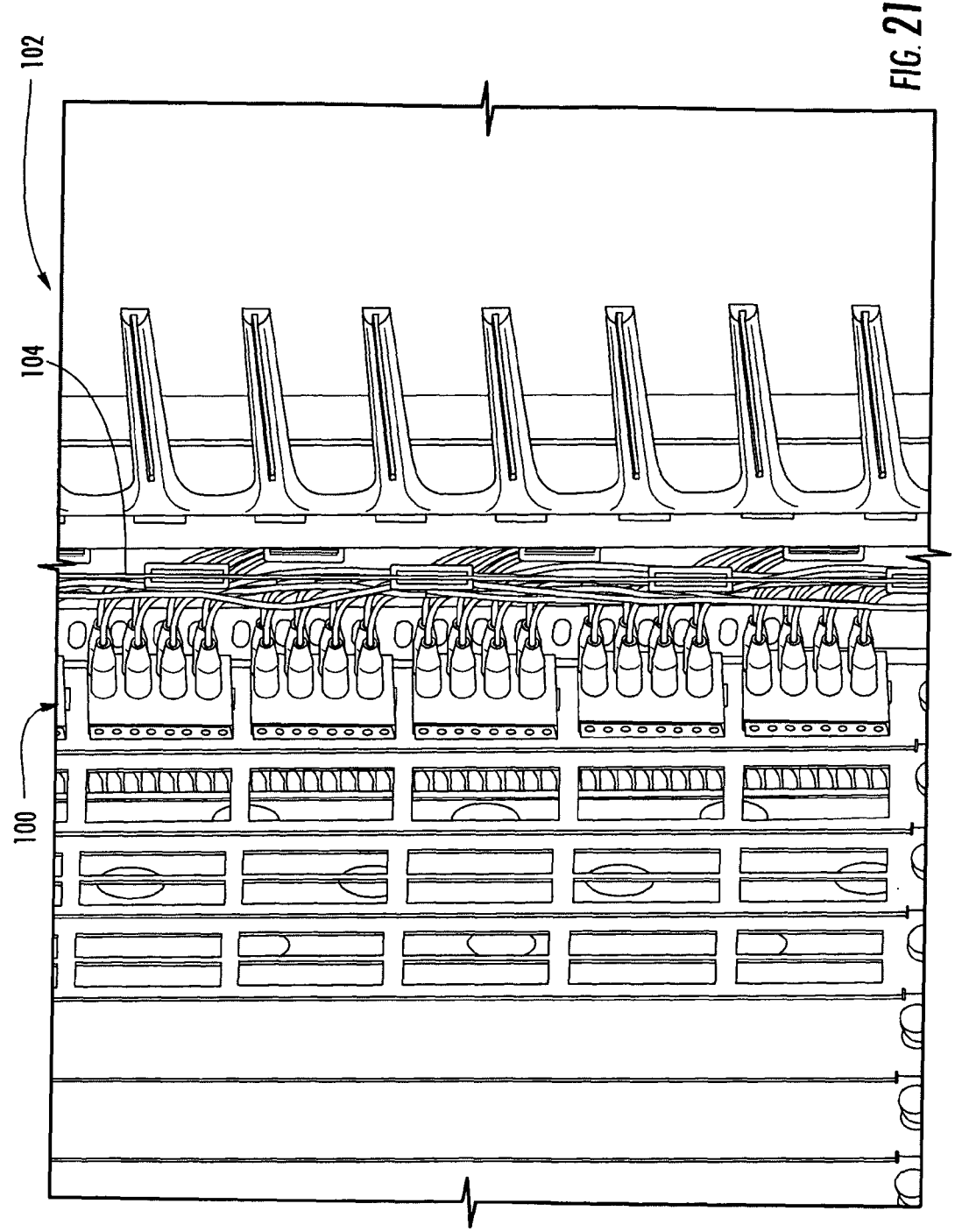
FIG. 21 is a partial side elevation view of an EDA cable assembly routed to SAN equipment employing furcations having at least one support feature supported by a support rod.

FIG. 21 illustrates a partial side elevation view of an EDA fiber optic cable assembly routed to the SAN fiber optic equipment 100 employing a support rod 104 structure also provided to support fiber optic cable assemblies 28, but in a vertical arrangement instead of the horizontal arrangement in FIGS. 20A-20C. The same concepts still apply. The U-shaped channel 54 of the furcation body 30 can be disposed around and secured to the support rod 104 to prevent the fiber optic cable assemblies 28 and their fiber optic cables 40 from sagging into adjacent rows. Any of the variations of the furcation body 30 previously described above are also possible for the support rod embodiments of FIGS. 20A-21. For example, one or more attachment features 76 may still be provided in the furcation body 30 for cable management or for further support and attachment, via an attachment device 41, to the support rod(s) 104.

Many modifications and other embodiments of the invention set forth herein will come to mind to one skilled in the art to which the invention pertains having the benefit of the teachings presented in the foregoing descriptions and the associated drawings. These modifications include, but are not limited to, type or size of fiber optic cable or furcated legs; size, dimensions, and materials of the furcation body; the type of fiber optic equipment or fiber optic patch panel supporting interconnections with fiber optic cable assemblies supported by the furcation body and one or more support features provided therein; and the dimensions of any support features, including the offset structure, the attachment feature, and/or the cable routing guides. Therefore, it is to be understood that the invention is not to be limited to the specific embodiments disclosed and that modifications and other embodiments are intended to be included within the scope of the appended claims. It is intended that the present invention cover the modifications and variations of this invention provided they come within the scope of the appended claims and their equivalents. Although specific terms are employed herein, they are used in a generic and descriptive sense only and not for purposes of limitation.

What is claimed is:

1. A fiber optic cable assembly having a fiber optic cable, a furcation body, and one or more furcated legs, the furcation body comprising:
   a first end and a second end opposite the first end, the first end having the fiber optic cable extending therefrom, and the second end having one or more furcation legs extending therefrom; and
   at least one offset structure disposed on the furcation body, wherein the at least one offset structure is adapted to cooperate with at least one offset structure on an adjacent furcation body and the at least one offset structure defines a portion of at least one fiber optic cable routing guide.

2. The fiber optic cable assembly of claim 1, wherein the at least one offset structure is comprised of a first offset structure and a second offset structure on the same side of the furcation body.

3. The fiber optic cable assembly of claim 1, wherein the at least one offset structure is comprised of at least one male portion and at least one female portion for attaching the furcation body with another furcation body.

4. The fiber optic cable assembly of claim 1, wherein the at least one offset structure is arranged either substantially parallel or substantially orthogonal to a longitudinal axis of the furcation body.

5. The fiber optic cable assembly of claim 1, further including a fiber optic cable routing guide on the furcation body.

6. The fiber optic cable assembly of claim 1, wherein the at least one offset structure cooperates with the at least one offset structure on an adjacent furcation body, thereby defining at least one area suitable for routing at least one fiber optic cable.

7. The fiber optic cable assembly of claim 1, further including a plurality of fiber optic cable routing guides.

8. The fiber optic cable assembly of claim 1, further including at least one attachment feature on the furcation body.

9. The fiber optic cable assembly of claim 8, wherein the at least one attachment feature is comprised of a first attachment feature on a side of the furcation body and a second attachment feature on an opposite side of the furcation body.

10. The fiber optic cable assembly of claim 9, wherein the at least one attachment feature further comprises a third attachment feature on a side of the furcation body disposed between the first attachment feature and the second attachment feature.

11. The fiber optic cable assembly of claim 9, wherein the attachment feature is comprised from the group consisting of a slip-loop, a hook, a recessed region, and a loop.

12. The fiber optic cable assembly of claim 1, further including an attachment device for cable routing management.

13. The fiber optic cable assembly of claim 1 further comprising a boot secured to the first end of the furcation body having the fiber optic cable extending therefrom.

14. The fiber optic cable assembly of claim 13, wherein the furcation body further comprises an external flange extending from the first end of the furcation body and receiving the boot.

15. The fiber optic cable assembly of claim 1, further including a plurality of furcation legs having different lengths.

16. A fiber optic assembly, comprising:
   a fiber optic patch panel;

a fiber optic cable assembly having a fiber optic cable, a furcation body, and one or more furcated legs, the furcation body comprising:

a first end and a second end opposite the first end, the first end having the fiber optic cable extending therefrom, and the second end having one or more furcated legs extending therefrom, wherein at least one furcation leg is routed and optically connected to the fiber optic patch panel;

at least one offset structure disposed on a side of the furcation body, wherein the at least one offset structure is adapted to cooperate with at least one offset structure on an adjacent furcation body and the at least one offset structure cooperates with the at least one offset structure on an adjacent furcation body, thereby defining at least one area suitable for routing at least one fiber optic cable;

at least one attachment feature on the furcation body, and an attachment device, wherein the attachment device engages the at least one attachment feature.

17. The fiber optic apparatus of claim 16, wherein the fiber optic assembly further includes a plurality of fiber optic cable assemblies having respective furcation bodies.

18. The fiber optic cable assembly of claim 16, wherein the attachment device is selected from the group consisting of a TY-RAP®; a VELCRO® strip, a string, an adhesive strip, a support rod, and a clamp.

19. The fiber optic cable assembly of claim 16, wherein the furcation body is secured to an adjacent furcation body.

20. The fiber optic cable assembly of claim 16, wherein the furcation body is secured to a support rod.

21. The fiber optic cable assembly of claim 16, further including at least one fiber optic cable routing guide on the furcation body.

22. The fiber optic cable assembly of claim 16, wherein a portion of at least one fiber optic cable routing guide is defined by the offset structure.

23. The fiber optic cable assembly of claim 16, wherein the attachment device secures a plurality of fiber optic cables to the furcation body for cable routing management.

24. The fiber optic assembly of claim 16, the fiber optic cable assembly further including a plurality of furcation legs having different lengths.

* * * * *